US009377078B2

(12) United States Patent
Kadowaki

(10) Patent No.: US 9,377,078 B2
(45) Date of Patent: Jun. 28, 2016

(54) LIQUID SEALED BUSHING

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/419,770

(22) PCT Filed: Aug. 2, 2013

(86) PCT No.: PCT/JP2013/070988
§ 371 (c)(1),
(2) Date: Feb. 5, 2015

(87) PCT Pub. No.: WO2014/024789
PCT Pub. Date: Feb. 13, 2014

(65) Prior Publication Data
US 2015/0211597 A1    Jul. 30, 2015

(30) Foreign Application Priority Data
Aug. 7, 2012 (JP) ................................. 2012-175420

(51) Int. Cl.
*F16F 1/36* (2006.01)
*F16F 13/14* (2006.01)
*B60K 5/12* (2006.01)
*F16F 13/10* (2006.01)

(52) U.S. Cl.
CPC ........... *F16F 13/1463* (2013.01); *B60K 5/1208* (2013.01); *F16F 13/10* (2013.01); *F16F 13/1427* (2013.01)

(58) Field of Classification Search
CPC ......... F16F 13/10; F16F 13/14; F16F 13/108; F16F 13/1427; F16F 13/1463; B60K 5/12; B60K 5/1208

USPC ................. 267/140.11–140.15, 140.2–140.4, 267/141.1–141.7
See application file for complete search history.

(56) References Cited

U.S. PATENT DOCUMENTS 4,702,346 A * 10/1987 Uno ........................ F16F 13/14
                                                    181/207
4,763,884 A *  8/1988 Matsui ................... F16F 13/28
                                                    267/121
(Continued)

FOREIGN PATENT DOCUMENTS

JP    3-009137    1/1991
JP    7-280024    10/1995
(Continued)

OTHER PUBLICATIONS

International Search Report, Date of mailing: Aug. 27, 2013.

*Primary Examiner* — Christopher Schwartz
(74) *Attorney, Agent, or Firm* — Rankin, Hill & Clark LLP

(57) ABSTRACT

A first orifice provides a connection between a first liquid chamber and a third liquid chamber that are formed in pairs to cause a volume variation in an opposite direction, and a second orifice provides a connection between a second liquid chamber and a fourth liquid chamber. A first communicating passage communicates between a second liquid chamber side portion of the second orifice and a second liquid chamber neighboring portion of the first orifice. In order of height of an input vibration frequency, a first resonance in the first orifice, a second resonance mainly in the second orifice between an enlarged liquid chamber consisting of the first and second liquid chambers, and the fourth liquid chamber, and a third resonance in a location that the first liquid chamber is connected through the first communicating passage to the second liquid chamber are produced.

10 Claims, 16 Drawing Sheets

(56) References Cited

U.S. PATENT DOCUMENTS

| | | | | | |
|---|---|---|---|---|---|
| 4,871,152 | A | * | 10/1989 | Funahashi | F16F 13/14 267/140.12 |
| 4,953,833 | A | * | 9/1990 | Schmidt | F16F 13/14 267/140.12 |
| 4,971,456 | A | * | 11/1990 | Hori | F16F 13/14 267/140.12 |
| 5,013,012 | A | * | 5/1991 | Jouade | F16F 13/1463 180/312 |
| 5,088,702 | A | * | 2/1992 | Thelamon | F16F 13/1418 267/140.12 |
| 5,123,634 | A | * | 6/1992 | Schwerdt | F16F 13/1481 267/140.12 |
| 5,547,172 | A | * | 8/1996 | Corcoran | F16F 13/16 267/140.13 |
| 5,702,094 | A | * | 12/1997 | McLelland | F16F 13/14 267/140.12 |
| 5,887,844 | A | * | 3/1999 | Fujiwara | F16F 13/14 267/140.11 |
| 2002/0145240 | A1 | * | 10/2002 | Satori | F16F 13/108 267/140.13 |

FOREIGN PATENT DOCUMENTS

| | | |
|---|---|---|
| JP | 2002-310219 | 10/2002 |
| JP | 2006-226363 | 8/2006 |

* cited by examiner

A

B

C

LIQUID SEALED BUSHING

TECHNICAL FIELD

The present invention relates to a liquid sealed bushing, and more particularly, to the liquid sealed bushing which has an orifice providing a connection between multiple liquid chambers and which creates resonance through the orifice.

BACKGROUND ART

There is publicly known a liquid sealed bushing of the type that comprises an elastic member for connecting an inner cylinder and an outer cylinder which are arranged concentrically, a plurality of liquid chambers being partitioned within the liquid sealed bushing, and an orifice connecting each of the liquid chambers.

In addition, there is also publicly known a liquid sealed bushing of the type that includes not less than four liquid chambers (six chambers, for instance) and not less than two orifices (three orifices, for instance), wherein each of the orifices is of a different resonance frequency so as to create or produce multiple resonances which are different in the resonance frequency (see a patent reference 1).

PRIOR ART REFERENCE

Patent reference 1: Japanese Patent Laid-open Publication JP 2002-310219 A.

DISCLOSURE OF THE INVENTION

Problem to be Solved by the Invention

By the way, in the conventional liquid sealed bushing, even if there are provided multiple liquid chambers of not less than four and multiple orifices of not less than two which communicate between these liquid chambers in such a manner that resonance is created or produced in each of the orifices, one orifice is formed to communicate between a pair of liquid chambers. Therefore, the number of orifices is a half of the liquid chambers. For obtaining a large number of resonances, it is necessary to provide a larger number of liquid chambers. However, since there are restrictions on such number of liquid chambers by a size of the entire device and the like, it is difficult to optionally increase the number of liquid chambers, so that the orifices also have been limited to a relatively small number. Although, in the case where there are provided 2n (n in here is an integer of not less than 2) liquid chambers in total consisting of n pairs, n orifices, namely, a half of the total of 2n liquid chambers are formed, it is therefore an object of the present invention to create or produce at least n+1 or more resonances that are more than the number of the orifices.

Moreover, the resonance produced through the orifice occurs only between a pair of liquid chambers connected by the orifice, and the level of the resonance is determined by a size of variation in volume of the pair of liquid chambers. However, if other liquid chamber is allowed to be involved in the resonance, the resonance efficiency can be increased according to the increase in fluid volume of the hydraulic liquid, whereby the strong resonance can be created. In addition, when a peak (corresponding to a peak value in a damping curve) of the resonance is lowered with an increase in number of resonance, the resonance range is expanded into a broader frequency range whereby the resonance can be broadened. It is therefore another object of the present invention to realize the creation of the strong resonance and the broadening of the resonance by the n+1 or more resonances.

Means for Solving the Problem

To solve the above described problems, a liquid sealed bushing according to a first aspect of the present invention comprises an inner cylinder, an outer cylinder, an elastic vibration isolating member elastically connecting the inner and outer cylinders, a first liquid chamber group and a second liquid chamber group being partitioned by the elastic vibration isolating member to cause expanding and contracting variations in volume relative to an input vibration and being formed in pairs such that expansion and contraction occur in an inverse relationship between the first liquid chamber group and the second liquid chamber group, the first liquid chamber group being further partitioned into at least a first liquid chamber and a second liquid chamber to cause a difference in volume change at the time of deformation, the second liquid chamber group being further partitioned into at least a third liquid chamber and a fourth liquid chamber to cause a difference in volume change at the time of deformation, a first orifice providing a connection between the first liquid chamber and the third liquid chamber, and a second orifice providing a connection between the second liquid chamber and the fourth liquid chamber, the first and second orifices being configured to create two resonances composed of a first resonance by the first orifice and a second resonance by the second orifice, wherein one of the first orifice and the second orifice communicates with another liquid chamber which is different from the pair of liquid chambers between which the one of the first and second orifices provides the connection, in such a manner as to create a third resonance which is different from the first resonance and the second resonance.

According to a second aspect of the present invention, in addition to the first aspect, a portion of the second orifice located in the vicinity of the second liquid chamber is connected through a communicating passage to a portion of the first orifice located in the vicinity of the first liquid chamber.

According to a third aspect of the present invention, in addition to the first aspect, a portion of the second orifice located in the vicinity of the second liquid chamber is directly connected by a communicating passage to the first liquid chamber.

According to a fourth aspect of the present invention, a liquid sealed bushing comprises an inner cylinder, an outer cylinder, an elastic vibration isolating member elastically connecting the inner and outer cylinders, a first liquid chamber group and a second liquid chamber group being partitioned by the elastic vibration isolating member to cause expanding and contracting variations in volume relative to an input vibration and being formed in pairs such that expansion and contraction occur in an inverse relationship between the first liquid chamber group and the second liquid chamber group, the pair of liquid chamber groups being further partitioned into a first liquid chamber and a second liquid chamber to cause a difference in volume change at the time of deformation, the pair of liquid chamber groups being further partitioned into a third liquid chamber and a fourth liquid chamber to cause a difference in volume change at the time of deformation, a first orifice providing a connection between the first liquid chamber and the third liquid chamber, and a second orifice providing a connection between the second liquid chamber and the fourth liquid chamber, the first and second orifices being configured to create two resonances composed of a first resonance by the first orifice and a second resonance by the second orifice, wherein the second orifice communicates with another liquid chamber located between the pair of liquid chambers connected by the second orifice.

According to a fifth aspect of the present invention, in addition to the fourth aspect, the second orifice is directly connected by a third communicating passage to the third liquid chamber.

According to a sixth aspect of the present invention, in addition to any one of the first to fifth aspects, the first liquid chamber and the second liquid chamber are partitioned by a first elastic wall, the second liquid chamber and the third liquid chamber are partitioned by a second elastic wall, the third liquid chamber and the fourth liquid chamber are partitioned by a third elastic wall, and the fourth liquid chamber and the first liquid chamber are partitioned by a fourth elastic wall, wherein the second elastic wall and the fourth elastic wall are arranged substantially along a direction (Y) orthogonal to a main vibration inputting direction (Z) and to an axial direction (X) of the inner cylinder, and the first elastic wall and the third elastic wall are arranged to intersect diagonally the orthogonal direction (Y).

According to a seventh aspect of the present invention, in addition to any one of the first to sixth aspects, there are provided n pairs (n is an integer of not less than 2) of liquid chambers including the first through fourth liquid chambers, and n orifices communicating between these liquid chambers formed in pairs, in such a manner as to create at least n−1 or more resonances.

Effects of the Invention

According to the first aspect of the present invention, the first and second orifices are configured to create two resonances composed of the first resonance by the first orifice and the second resonance by the second orifice, and one (for instance, the second orifice) of the first orifice and the second orifice communicates with another liquid chamber (for instance the first liquid chamber) which is different from the pair of liquid chambers (for instance, the second liquid chamber and the fourth liquid chamber) between which the one of the first and second orifices provides the connection, in such a manner as to create the third resonance which is different from the first resonance and the second resonance.

Then, the first resonance is created through the first orifice providing the connection between the first liquid chamber and the third liquid chamber which cause the variation in volume in the inverse relationship (in the opposite directions) to each other. The second resonance is created mostly in the second orifice providing the connection between the fourth liquid chamber and an enlarged liquid chamber which is formed by integrally combining the first liquid chamber and the second liquid chamber. At that time, the enlarged liquid chamber and the fourth liquid chamber cause the variation in volume in the inverse relationship (in the opposite directions) to each other. The third resonance is created in a communicating portion between the first liquid chamber and the second liquid chamber which cause the difference in volume change at the time of deformation.

Therefore, the resonances more than the number of orifices are able to be created, so that the resonance range can be broadened. In addition, the number of liquid chambers and the number of orifices are able to be decreased, whereby it is possible to realize the compactification of the device and the simplification of the structure.

Moreover, since a portion of the second orifice located in the vicinity of second liquid chamber communicates with the first liquid chamber side to provide the enlarged liquid chamber formed by combining the first liquid chamber and the second liquid chamber, the second resonance can be increased in resonance efficiency, whereby it is possible to provide the strong resonance.

According to the second aspect of the present invention, since the portion of the second orifice located in the vicinity of the second liquid chamber is connected through the communicating passage to the portion of the first orifice located in the vicinity of the first liquid chamber, the second orifice can be connected to the first liquid chamber by making use of the first orifice.

According to the third aspect of the present invention, since the portion of the second orifice located in the vicinity of the second liquid chamber is directly connected by the communicating passage to the first liquid chamber, the second orifice can be easily connected to the first liquid chamber.

According to the fourth aspect of the present invention, since one (for instance, the second orifice) of the first orifice and the second orifice communicates with the third liquid chamber which is located between the pair of liquid chambers (for instance, the second liquid chamber and the fourth liquid chamber) connected by the second orifice, an intermediate portion of the second orifice is connected by a short-circuit to the third liquid chamber. Thus, since the second orifice is divided at this short-circuit portion, the second resonance is created in a portion of the second orifice connecting the second liquid chamber and the third liquid chamber which cause the variation in volume in the inverse relationship (in the opposite directions) to each other, and the third resonance is created in a portion of the second orifice connecting the third liquid chamber and the fourth liquid chamber which have the difference in volume change from each other.

Therefore, since, as a whole, three resonances inclusive of the first resonance by the first orifice are created, the resonances which are more than the number of orifices are able to be created, so that the resonance range can be broadened. At the same time, the number of liquid chambers and the number of orifices are able to be decreased, whereby it is possible to realize the compactification of the device and the simplification of the structure.

In addition, the second resonance and the third resonance are created through the divided portion of the second orifice. Therefore, although the strength of the resonance is weakened in comparison with the resonance created in the entire length of the second orifice, it is possible to realize the broadening that is so improved as to show a more flattened dynamic characteristic.

According to the fifth aspect of the present invention, since the portion of the second orifice located in the vicinity of the third liquid chamber is directly connected by the third communicating passage to the third liquid chamber, it is easy to form the third communicating passage, and the intermediate portion of the second orifice can be easily connected by a short circuit to the third liquid chamber.

According to the sixth aspect of the present invention, since the second elastic wall and the fourth elastic wall are arranged substantially along a direction (Y) orthogonal to a main vibration inputting direction (Z) and to an axial direction (X) of the inner cylinder, and the first elastic wall and the third elastic wall are arranged to intersect diagonally an axis (Y), the volume variation in the opposite directions occurs between each of the first liquid chamber and the second liquid chamber and each of the third liquid chamber and the fourth liquid chamber. At the same time, although the volume variation in the same direction occurs between the first liquid chamber and the second liquid chamber or between the third liquid chamber and the fourth liquid chamber, it is possible to vary the readiness of the volume variation therebetween.

According to the seventh aspect of the present invention, there are provided n pairs of liquid chambers and n orifices communicating between these liquid chambers formed in pairs, and the second orifice is connected through the first communicating passage or the second communicating passage to the first orifice or the first liquid chamber, and the intermediate portion of the second orifice is connected through the third communicating passage to the third liquid chamber. Therefore, it is possible to create at least n+1 or more resonances.

BEST MODE FOR CARRYING OUT THE INVENTION

Figure 1:
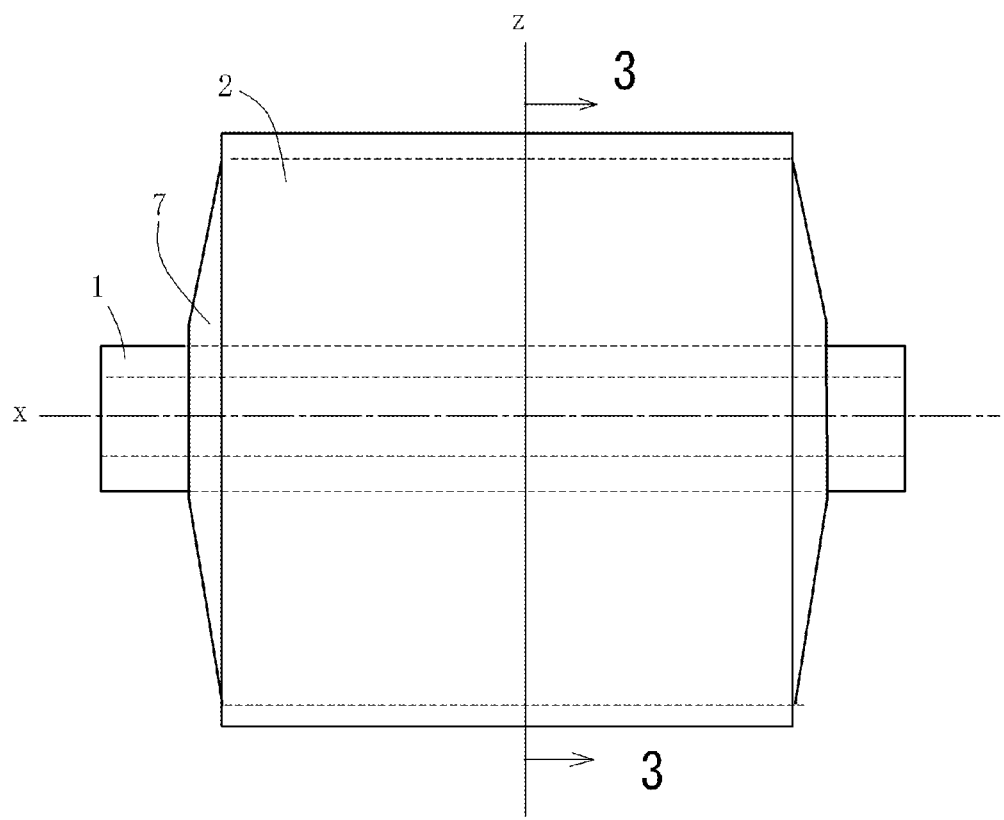
FIG. 1 is a front view of a cylindrical type liquid sealed bushing in accordance with the present invention.
Figure 2:
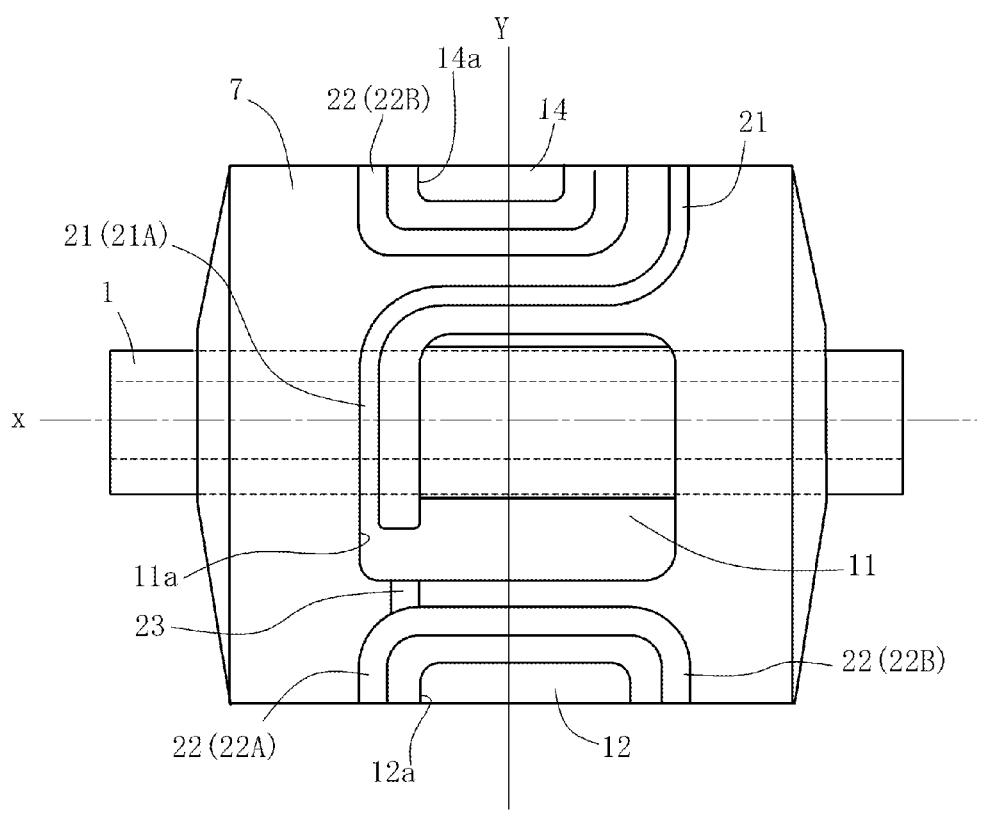
FIG. 2 is a view showing the condition that an outer cylinder is removed from the liquid sealed bushing in accordance with a first embodiment (FIGS. 2 to 6)
Figure 3:
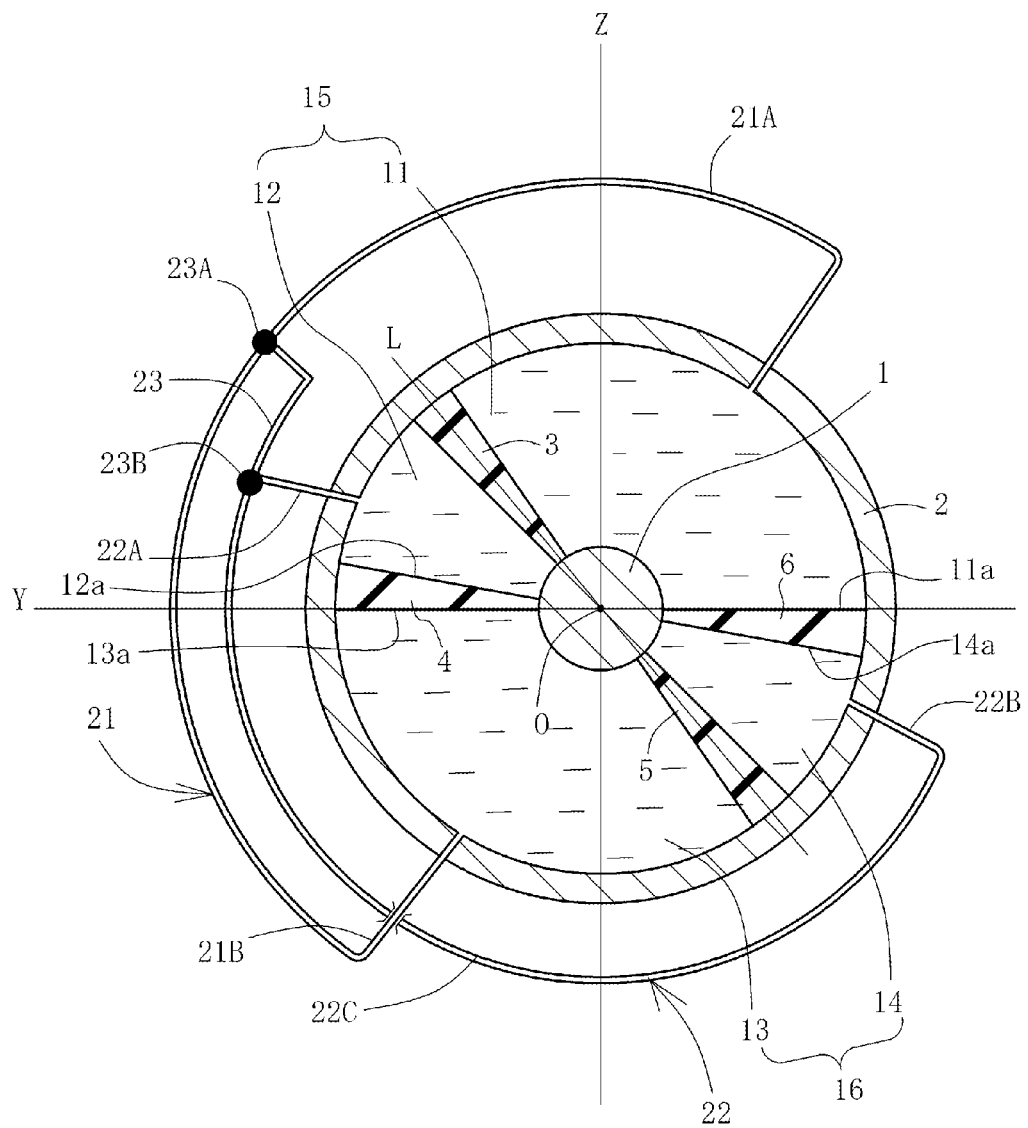
FIG. 3 is a theoretical cross sectional view of a portion taken along line 3-3 of FIG. 1.
Figure 4:
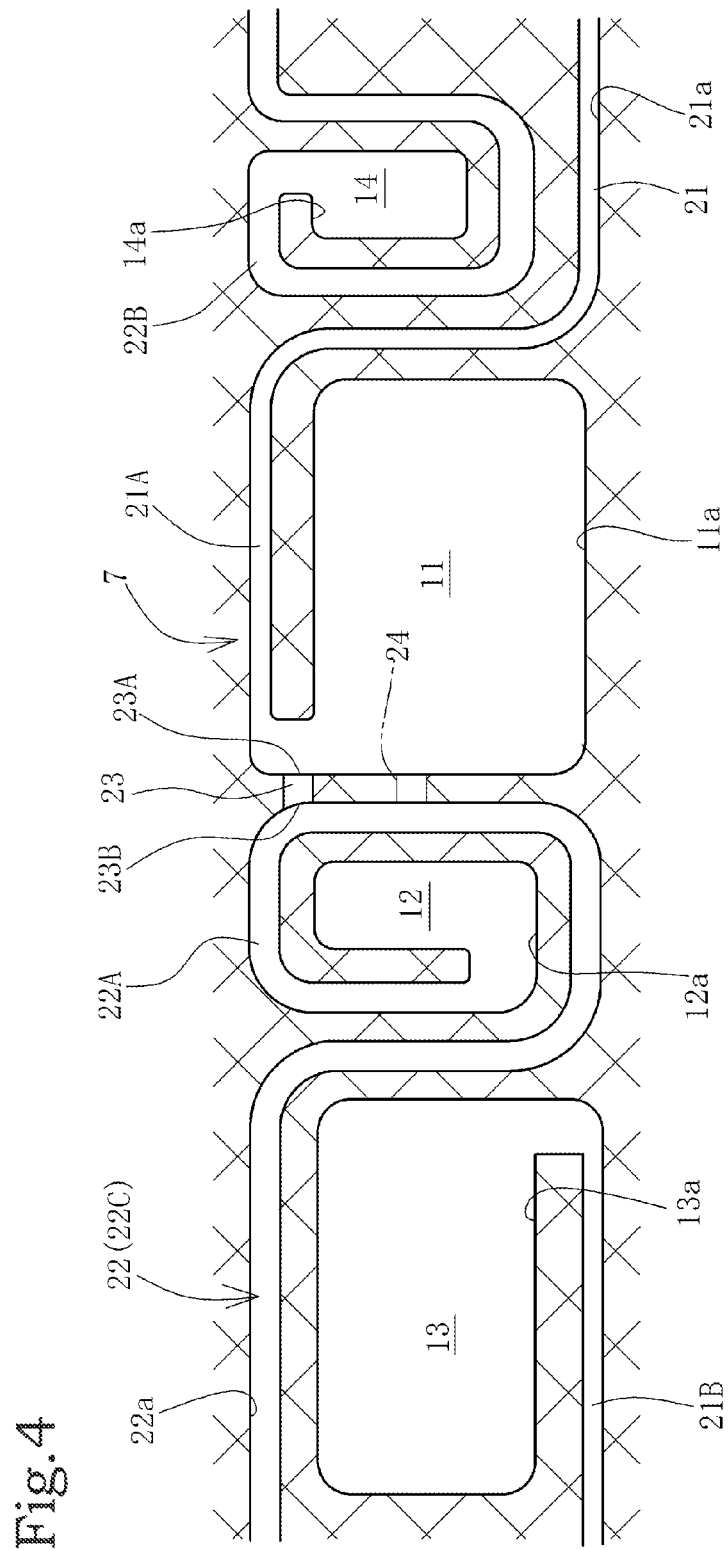
FIG. 4 is a development of orifices.
Figure 5:
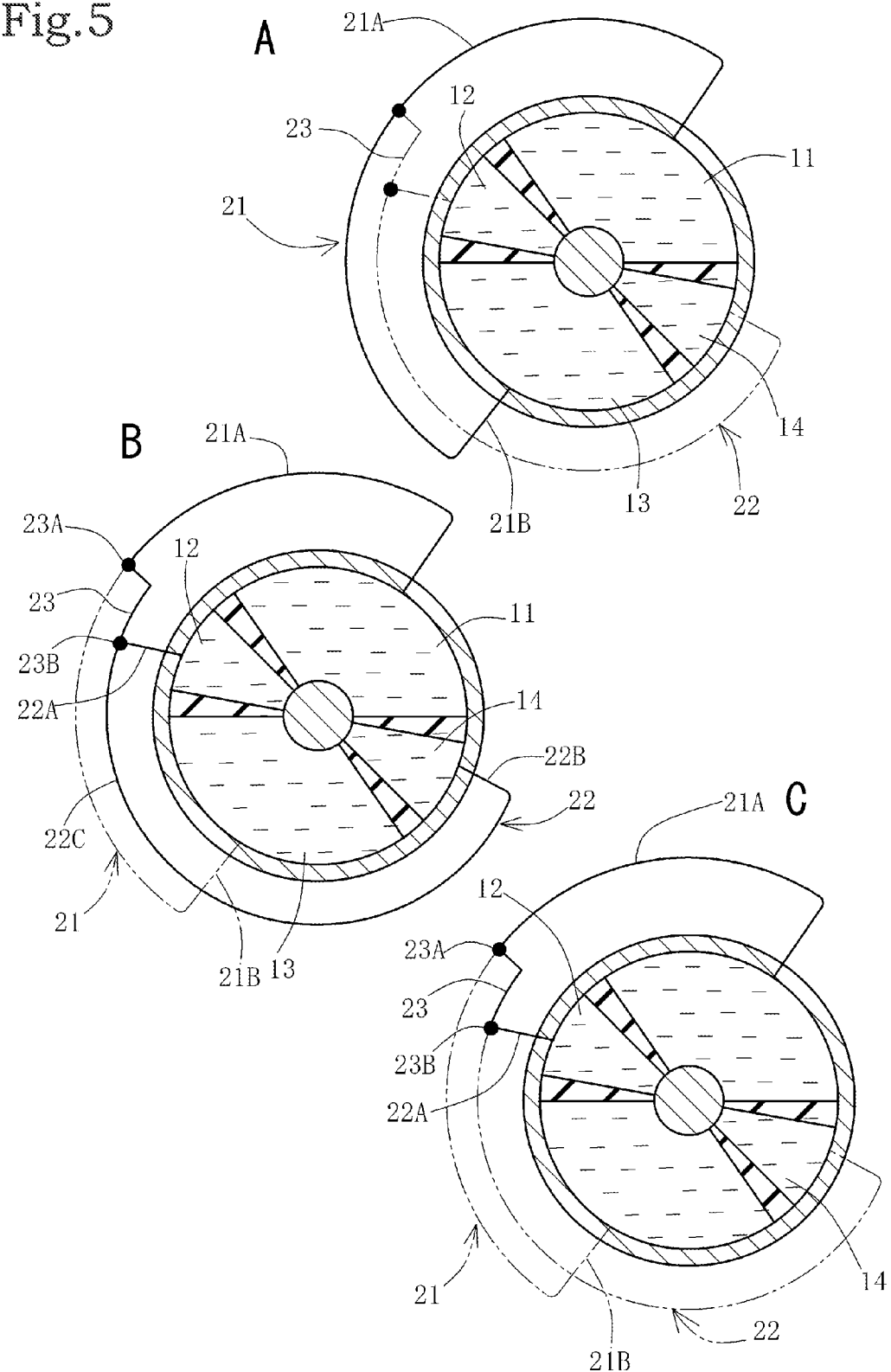
FIG. 5 is a view of assistance in explaining the operation by using the theoretical cross section of FIG. 3.
Figure 6:
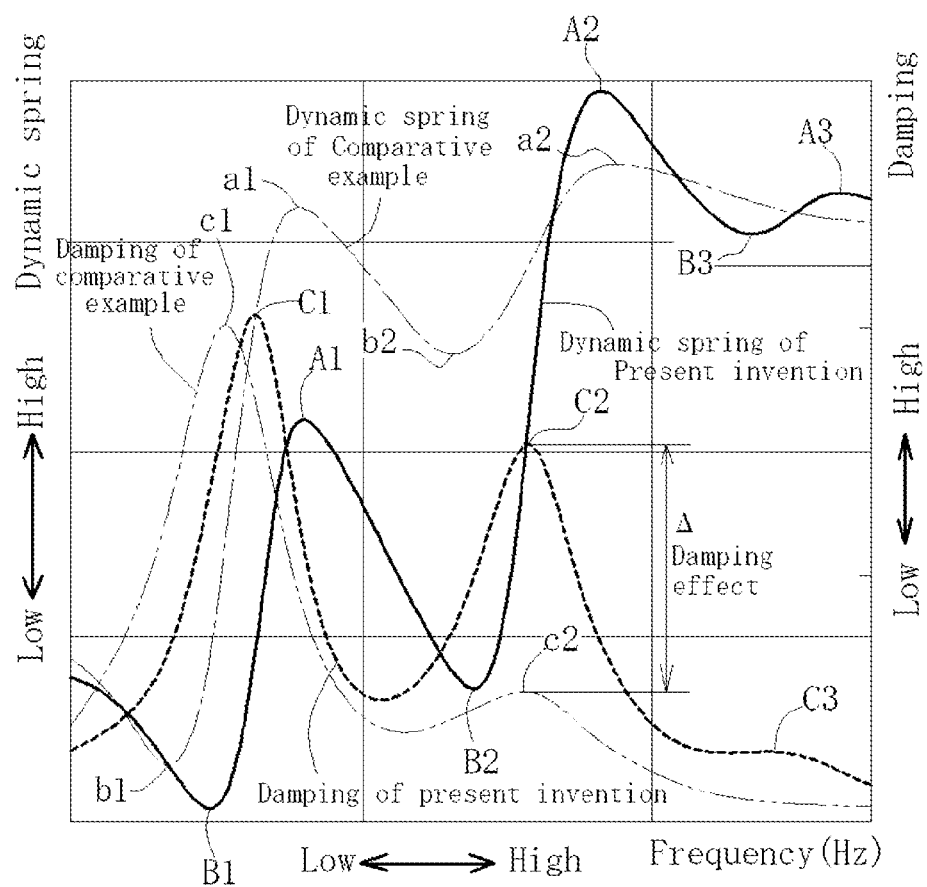
FIG. 6 is a graph of a dynamic characteristic.

Hereinafter, the first embodiment of the present invention will be explained with reference to FIGS. 1 to 6. FIG. 1 is a front view of a cylindrical type liquid sealed bushing, viewed from the direction orthogonal to a cylindrical shaft thereof. FIG. 2 is a view of a cylindrical elastic body in which the position of the cylindrical elastic body is rotated 90 degrees in a circumferential direction from the condition of FIG. 1 that an outer cylinder is removed from the liquid sealed bushing of FIG. 1. FIG. 3 is a cross sectional view of a corresponding part taken along line 3-3 of FIG. 1 and theoretically shows a cross section in the direction orthogonal to an axis of the cylindrical liquid sealed bushing. FIG. 4 is a development of orifices. FIG. 5 is an explanatory view of the operation by using the theoretical cross section of FIG. 3. FIG. 6 is a graph of a dynamic characteristic.

By the way, in FIG. 1, a central axis of the cylindrical shaft is referred to as X, and an axis orthogonal to the central axis and parallel to an inputting direction of a main vibration is referred to as Z. In FIG. 2, an axis orthogonal to these axes X and Z is referred to as Y. The axes X, Y and Z are three axes orthogonal to one another, and the central axis X is also a central axis of the liquid sealed bushing of the present invention.

This liquid sealed bushing is employed as an engine mount for a motor car, and in a loaded condition on the vehicle, the X axis extends in a forward and rearward direction of the vehicle, and the Y axis extends in a left and right direction of the vehicle. In addition, the main vibration is a vibration in an upward and downward direction of the vehicle, and the Z axis extends in the upward and downward direction of the vehicle. Therefore, in the following explanation, each of the directions in parallel with the axes X, Y and Z are also referred to as the forward and rearward direction, the left and right direction, and the upward and downward direction, respectively.

Referring now to FIG. 1, this liquid sealed bushing is in a cylindrical shape and is formed of an inner cylinder 1 and an outer cylinder 2 which are arranged concentric with each other. The inner cylinder 1 and the outer cylinder 2 are connected by a cylindrical elastic vibration isolating member 7.

As shown in FIG. 2, the elastic vibration isolating member 7 is a publicly known main vibration isolating body in substantially a cylindrical shape made of an elastic body such as rubber or the like. The elastic vibration isolating member 7 is formed integral with the inner cylinder 1 along a central axis thereof (in parallel with the X axis).

As shown in FIG. 2, the elastic vibration isolating member 7 is provided with a plurality of pocket-shaped recesses (11a, 12a, 14a) each of which opens toward an outer lateral side in the circumferential direction to form a liquid chamber (11, 12, 14). On an outer lateral surface of the elastic vibration isolating member 7, there are formed outwardly open orifice grooves in such a manner as to connect each of the pocket-shaped recesses. These pocket-shaped recesses and the orifice grooves are closed by the outer cylinder 2 to form liquid chambers and orifices (21, 22).

By the way, although there is another liquid chamber (a third liquid chamber 13 to be referred to later), it is not visible since it is hidden behind the pocket-shaped recess 11a (a first liquid chamber 11 to be referred to later).

As shown in FIG. 3, the plurality of pocket-shaped recesses (11a, 12a, 13a, 14a) partitioned by a plurality of elastic walls are provided on an inside of the elastic vibration isolating member 7. These pocket-shaped recesses (11a, 12a, 13a, 14a) open outwardly to form a tightly sealed liquid chamber respectively when opening portions thereof are covered by the outer cylinder 2. In the drawing, the liquid chamber is partitioned into the first liquid chamber 11, a second liquid chamber 12, the third liquid chamber 13 and a fourth liquid chamber 14 by a first elastic wall 3, a second elastic wall 4, a third elastic wall 5 and a fourth elastic wall 6, respectively. These liquid chambers and orifice passages to be referred to later are filled with incompressible hydraulic fluid.

When an intersection point of the main vibration inputting axis Z with the axis Y orthogonal to the axis Z is a center O, the first liquid chamber 11 and the third liquid chamber 13 are arranged in pairs on opposite sides of the center O. In addition, the second liquid chamber 12 and the fourth liquid chamber 14 also are arranged in pairs on the opposite sides of the center O.

These first liquid chamber 11 and third liquid chamber 13 form a pair of large capacity chambers. The first liquid chamber 11 and the third liquid chamber 13 which form the pair of large capacity chambers cause variations in volume in such a manner as to expand and contract the volume of these chambers in an inverse relationship with respect to the main vibration inputting direction corresponding to the direction of Z axis such that, when one of these chambers contracts its volume, the other expands its volume.

The second liquid chamber 12 and the fourth liquid chamber 14 form a pair of small capacity chambers and also cause variations in volume in such a manner as to expand and contract the volume of these chambers in the inverse relationship to each other.

Further, a pair of the first liquid chamber 11 and the second liquid chamber 12 forms an upper liquid chamber group 15 corresponding to substantially an upper half of FIG. 1, while a pair of third liquid chamber 13 and the fourth liquid chamber 14 forms a lower liquid chamber group 16 corresponding to substantially a lower half of FIG. 1. The upper liquid chamber group 15 and the lower liquid chamber group 16 each are formed by the combination of the first liquid chamber 11 as the large capacity chamber and the second liquid chamber 12 as the small capacity chamber or the combination of the third liquid chamber as the large capacity chamber and the fourth liquid chamber 14 as the small capacity chamber.

By the way, the upper liquid chamber group 15 and the lower liquid chamber group 16 correspond to the liquid chambers of the present invention formed in pairs to cause variations in volume in the inverse relationship.

Each of the liquid chambers (11 and 12 or 13 and 14) forming the upper liquid chamber group 15 or the lower liquid chamber group 16 causes the variations in volume in such a manner as to expand and contract the volume thereof in the same direction. The liquid chambers of the upper liquid chamber group 15 and the liquid chambers of the lower liquid chamber group 16 cause the variations in volume in such a manner as to expand and contract the volume thereof in an inverse relationship (in the opposite directions) to each other.

For instance, when the main vibration is inputted into the inner cylinder 1 in the direction of Z axis from an upper side to a lower side of the drawing, the first liquid chamber 11 and the second liquid chamber 12 forming the upper liquid chamber group 15 are expanded in volume, while the third liquid chamber 13 and the fourth liquid chamber 14 forming the lower liquid chamber 16 are contracted in volume. When the direction of the vibration is reversed, the expansion and contraction occur inversely.

Further, in the upper liquid chamber group 15 or the lower liquid chamber group 16, a degree of the volume variation is different between the chambers. Namely, the liquid chambers forming the group cause a difference in volume change at the time of deformation. For instance, in the upper liquid chamber group 15, when the inner cylinder 1 moves upwardly in the drawing along the Z axis, the first liquid chamber 11 as the large capacity chamber is largely contracted since the fourth elastic wall 6 and the first elastic wall 3 each are elastically deformed upwardly in the drawing.

On the other hand, with respect to the second liquid chamber 12 as the small capacity chamber, although the first elastic wall 3 and the second elastic wall 4 each are elastically deformed upwardly in the drawing, the degree of contraction of the second liquid chamber 12 is small as against the first liquid chamber 11 since the first elastic wall 3 is inclined relative to the Z axis and has a tendency to be elastically deformed in the escaping (expanding) direction from the second liquid chamber 12. Namely, the volume change of the second liquid chamber 12 is smaller than that of the first liquid chamber 11 whereby the difference in volume change is developed at the time of the mutual deformation.

Similarly, in the lower liquid chamber group 16, the degree of the volume variation is different between the third liquid chamber 13 and the fourth liquid chamber 14, whereby the difference in volume change is developed at the time of the mutual deformation.

Like this, in order that the upper liquid chamber group 15 and the lower liquid chamber group 16 are partitioned upwardly and downwardly, the second elastic wall 4 and the fourth elastic wall 6 are arranged on substantially the Y axis. However, the first elastic wall 3 and the third elastic wall 5 are arranged each on a straight line L which passes the center O and which is inclined from the Z axis to come closer to the second elastic wall 4 and the fourth elastic wall 6. Thus, the degree of the expansion or contraction, namely, a coefficient of volume variation is different between the large capacity chamber and the small capacity chamber in the same upper liquid chamber group 15 or the same lower chamber group 16, whereby to be configured to cause the difference of the volume change.

Further, when the pair of liquid chambers causes the variation in volume, the movement of the hydraulic liquid needs to be allowed. In order to allow the movement of the hydraulic liquid, the liquid chambers formed in pairs between the upper liquid chamber group 15 and the lower liquid chamber group 16 are in communication with each other by an orifice. Namely, the first liquid chamber 11 is connected by a first orifice 21 to the third liquid chamber 13, while the second liquid chamber 12 is connected by a second orifice 22 to the fourth liquid chamber 14.

In addition, in the vicinity of the second liquid chamber 12, a first liquid chamber side portion 21A of the first orifice 21 is connected to a second liquid chamber side portion 22A of the second orifice 22 by a first communicating passage 23.

By the way, although, in FIG. 3, in order to simplify an understanding, the first orifice 21, the second orifice 22 and the first communicating passage 23 are schematically illustrated on an outside of the outer cylinder 2, they actually are formed between the elastic vibration isolating member 7 and the outer cylinder 2.

A development representing a detailed structure of each of these orifices is shown in FIG. 4. FIG. 4 is an illustration of an outer lateral surface of the elastic vibration isolating member 7 developed long on a flat surface in a circumferential direction in a state of removing the outer cylinder 2. To be precise, although openings of the pocket-shaped recesses (11a, 12a, 13a, 14a) and orifice grooves (21a, 22a) are illustrated, the explanation will be made as the liquid chambers corresponding to the openings and as the orifices corresponding to the orifice grooves, in order to simplify the explanation.

By the way, there may be cases where a cover member is put on the outer lateral surface of the elastic vibration isolating member 7 so as to close each of the pocket-shaped recesses (11a, 12a, 13a, 14a), and then is fitted into the outer cylinder 2. In this case, the orifice grooves (21a, 22a) may be provided in the cover member.

As shown in the development, the first orifice 21 is formed into a relatively narrow channel and tuned in such a way as to produce a first resonance at low frequency H1. The first liquid chamber side portion 21A of the first orifice 21 is a portion located in the vicinity of or neighboring on a connecting portion to the first liquid chamber 11. A portion located in the vicinity of or neighboring on a connecting portion to the third liquid chamber 13 is a third liquid chamber side portion 21B.

The second orifice 22 communicates between the second liquid chamber 12 and the fourth liquid chamber 14 and winds in a curled shape around circumferences of the second liquid chamber 12 and the fourth liquid chamber 14. The second orifice 22 has more curved portions than the first orifice 21 and is configured to be longer than the first orifice 21. The second orifice 22 is tuned in such a way as to create the second resonance at a higher frequency H2 (H1<H2).

Moreover, the winding portions in a curled shape around the circumferences of the second liquid chamber 12 and the fourth liquid chamber 14 are formed as the second liquid chamber side portion 22A and a fourth liquid chamber side portion 22B, respectively. In addition, a portion located between the second liquid chamber side portion 22A and the fourth liquid chamber side portion 22B is formed as a second orifice main body portion 22C.

The first communicating passage 23 provides a connection between the second liquid chamber side portion 22A of the second orifice 22 and the first liquid chamber side portion 21A of the first orifice 21, in the vicinity of the second liquid chamber 12 (in FIG. 3, there is schematically illustrated a condition that an intermediate portion of the first orifice 21 is connected to a location in the vicinity of the connecting portion of the second orifice 22 to the second liquid chamber 12).

A connecting portion of the first orifice 21 to the first communicating passage 23 is designated as 23A. A portion extending from this connecting portion 23A to the first liquid chamber 11 is referred to as the first liquid chamber side portion 21A. Similarly, a connecting portion of the second orifice 22 to the first communicating passage 23 is designated as 23B.

The first communicating passage 23 is a passage communicating between the first orifice 21 and the second orifice 22. However, the first orifice 21 connects the first liquid chamber 11 and the third liquid chamber 13 each of which causes a large volume variation, and the second orifice 22 connects the second liquid chamber 12 and the fourth liquid chamber 14 each of which causes a smaller volume variation. Therefore, when the hydraulic liquid flows into the first orifice 21, it does not flow into the second orifice 22, and the first orifice 21 is given preference to the second orifice 22. As a result of this, even if the first orifice 21 and the second orifice 22 are connected by the first communicating passage 23, the hydraulic liquid flows through the first orifice 21 and does not flow into the first communicating passage 23 and the second orifice 22 when the input frequency is at the first resonance frequency level or less and the first orifice 21 is not clogged.

On the other hand, when the first orifice 21 is clogged by an increase of the input vibration frequency, the hydraulic liquid within the first liquid chamber 11 flows through the first communicating passage 23 into the second orifice 22. At the same time, the hydraulic liquid within the second liquid chamber 12 also flows into the second orifice 22. Therefore, the hydraulic liquid from an enlarged liquid chamber combining the first liquid chamber 11 with the second liquid chamber 12 in appearance flows into the second orifice 22 whereby to produce the second resonance at a second resonance frequency. At that time, since the upper liquid chamber group 15 composed of the first liquid chamber 11 and the second liquid chamber 12 forming the combined virtual enlarged liquid chamber and the fourth liquid chamber 14 forming the lower liquid chamber group 16 cause the volume vibrations in the inverse relationship (in the opposite directions) to each other, the hydraulic liquid within the first liquid chamber 11 does not flow from the first communicating passage 23 to the second liquid chamber 12 but flows into the fourth liquid chamber 14.

Then, referring to FIG. 3, the second resonance is produced through the first liquid chamber side portion 21A of the first orifice 21 and the first communicating passage 23 in addition to the second orifice 22. However, in the structure shown in FIG. 4 (FIG. 4 shows a concrete orifice arrangement), the length of the first liquid chamber side portion 21A and the length of the first communicating passage 23 are able to be practically ignored, so that the second resonance occurs through mostly the second orifice 22.

Further, when the second orifice 22 also is clogged by the increase of the frequency of the input vibration, the difference in volume change is developed between the first liquid chamber 11 and the second liquid chamber 12 forming the same upper liquid chamber group 15, so that the hydraulic liquid within the first liquid chamber 11 flows through the first communicating passage 23 into the second liquid chamber 12 which is smaller in the volume variation. Therefore, a flow channel composed of the first liquid chamber side portion 21A—the first communicating passage 23—the second liquid chamber side portion 22A is formed, whereby to cause the third resonance at a predetermined third resonance frequency.

By the way, in the structure shown in FIG. 4, the length of the first liquid chamber side portion 21A and the length of the first communicating passage 23 are able to be practically ignored, so that in substance the third resonance occurs through mostly the second liquid chamber side portion 22A of the second orifice 22.

Next, the operation of this embodiment will be explained.

In FIG. 3, when the main vibration is inputted into the inner cylinder 1 along the Z axis, the upper liquid chamber group 15 and the lower liquid chamber group 16 perform opposite movements of expansion and contraction. For instance, when the inner cylinder 1 moves upwardly of the FIG. 3, the first liquid chamber 11 and the second liquid chamber 12 forming the upper liquid chamber group 15 are contracted while the third liquid chamber 13 and the fourth liquid chamber 14 forming the lower liquid chamber group 16 are expanded, so that the volume of each of the chambers changes.

The first liquid chamber 11 and the third liquid chamber 13 formed in pairs, and the second liquid chamber 12 and the fourth liquid chamber 14 formed in pairs are arranged point-symmetrical with respect to the center O, respectively, and have such arrangement as to cause the volume variations in the inverse relationship (in the opposite directions) to each other, so that the size of the volume variation is the same (the expansion and contraction occur inversely).

Therefore, the hydraulic liquid flows through each of the orifices so as to compensate for the volume changes of the liquid chambers. The flow of the hydraulic liquid is performed first through the first orifice 21 providing the connection between the first liquid chamber 11 and the third liquid chamber 13 which are largest in volume variation, at the frequency below the first resonance frequency H1 at which the first orifice 21 is not clogged.

As shown in FIG. 5-A, the hydraulic liquid flows through the first orifice 21 and moves between the first liquid chamber 11 and the third liquid chamber 13. At that time, since the hydraulic liquid flows preferentially into a channel which is easy to flow, it does not flow through the second orifice 21 and the first communicating passage 23. Accordingly, the first orifice 21 causes the first resonance at the first resonance frequency H1 which is the predetermined low frequency.

After that, when the frequency of the input vibration becomes higher than the first resonance frequency H1, the first orifice 21 is clogged. Then, as shown in FIG. 5-B, the hydraulic liquid of the first orifice 21 flows from the first liquid chamber side portion 21A of the first orifice 21 to the first communicating passage 23. In addition, the hydraulic liquid also flows through the second orifice 22 between the second liquid chamber 12 and the fourth liquid chamber 14.

Accordingly, the hydraulic liquid flows between the second liquid chamber 12 and the fourth liquid chamber 14 through the second orifice 22. In addition, the hydraulic liquid flows between the first liquid chamber 11 and the fourth liquid chamber 14 through the first communicating passage 23 and the first liquid chamber side portion 21A of the first orifice 21.

Thus, the enlarged liquid chamber combining the first liquid chamber 11 with the second liquid chamber 12 is in communication with the fourth liquid chamber 14 through the second orifice 22 and the first communicating passage 23, so that the second resonance is created mostly in the second orifice 22 by the flow of the hydraulic liquid between the enlarged liquid chamber and the fourth liquid chamber 14.

The second resonance frequency H2 in the second resonance is a predetermined frequency which is higher than the first resonance frequency H1.

Like this, since the hydraulic liquid flows and resonates between the enlarged liquid chamber combining the first liquid chamber 11 with the second liquid chamber 12, and the fourth liquid chamber 14 whereby a flow amount of the hydraulic liquid is increased, the resonance efficiency of the second resonance is increased in comparison with the case where the hydraulic liquid flows merely between the second liquid chamber 12 and the fourth liquid chamber 14, for instance, so that the dynamic characteristic is improved on a large scale as shown in FIG. 6 to be referred to later.

When the frequency of the input vibration becomes higher than the second resonance frequency H2, the second orifice 22 also is clogged, and the hydraulic liquid within the first liquid chamber 11 flows through the first communicating passage 23 into the second liquid chamber 12 which is smaller in the volume variation. As a result of this, a flow channel composed of the first liquid chamber side portion 21A—the first communicating passage 23—the second liquid chamber side portion 22A is formed whereby to create the third resonance at a predetermined third resonance frequency H3.

FIG. 6 is a graph showing the dynamic characteristic of this embodiment, wherein a horizontal axis is a frequency Hz of the input vibration, a left vertical axis is a dynamic spring constant KD (N/mm) and a right vertical axis is a damping C (N·S/mm).

A curve shown by a thick solid line is a dynamic spring curve of this embodiment, and a curve shown by a thick dotted line is a damping curve of this embodiment. In addition, a curve shown by a thin chain line is a dynamic spring curve of a comparative example and a curve shown by a thin two-dot chain line is a damping curve thereof. The comparative example is formed with a structure in which a communication system between the first orifice 21 and the second orifice 22 through the first communicating passage 23 is removed from this embodiment.

Referring to this graph, in the dynamic spring curve of the comparative example, there are indicated two peaks (maximum values) a1 and a2, and two bottoms (minimum values) b1 and b2. The bottom b1 indicates the first resonance, and the peak a1 indicates the antiresonance thereof. Similarly, the bottom b2 indicates the second resonance, and the peak a2 indicates the antiresonance thereof. In the dynamic spring curve of the comparative example, there are produced a peak c1 by the first resonance and a peak c2 by the second resonance. Namely, two resonances consisting of the first and second resonances are produced in the comparative example.

On the other hand, according to the present invention, in the dynamic spring curve, there are produced three bottoms B1~B3. In addition, three peaks A1~A3 of antiresonance are produced between the bottoms B1 and B2, between the bottoms B2 and B3, and on a higher frequency side than B3, respectively. The bottom B1 indicates the occurrence of the first resonance. The bottoms B2 and B3 indicate the occurrence of the second resonance and the third resonance, respectively.

Further, in the damping curve, there are produced a peak C1 by the first resonance, a peak C2 by the second resonance and a peak C3 by the third resonance.

By the way, in this graph, the frequency corresponding to the peak value of the damping curve is considered as the resonance frequency, for convenience. However, it is apparent from the fact that the bottom value of the dynamic spring curve and the peak value of the damping curve are out of sync with each other, that the actual resonance frequency is a value having a certain range including the bottom value of the dynamic spring curve and the peak value of the damping curve.

In this embodiment, there are produced three resonances consisting of the first to three resonances. The first resonance, the second resonance and the third resonance are produced while centering each on the first resonance frequency H1, the second resonance frequency H2 and the third resonance frequency H3.

When comparing this embodiment with the comparative example, the first resonance of this embodiment is produced at a little higher frequency, namely, the first resonance frequency H1 (in the neighborhood of about 15 Hz, for instance), the dynamic spring is lower than that of the comparative example (B1<b1), and the damping is higher than that of the comparative example (c1<C1).

The second resonance is produced at the second resonance frequency H2 (in the neighborhood of about 45 Hz, for instance) which is higher than the first resonance. The dynamic spring becomes quite a low dynamic spring (B2<b2), and the damping also becomes quite a high damping (c2<C2). When comparing the damping of this embodiment with that of the comparative example, the damping effect Δ (C2−c2) is about double the peak value c2 of the comparative example whereby to indicate that the high damping is achieved.

By such low dynamic spring and high damping, the remarkable improvement of the dynamic characteristic becomes possible.

Such remarkable improvement of the dynamic characteristic is caused by having the liquid chamber concerned in the second resonance in this embodiment, enlarged by the combination of the first liquid chamber 11 and the second liquid chamber 12, so as to increase the resonance efficiency. In the dynamic characteristic curve, there is produced the strong resonance indicating a peaky characteristic such that a curve of the peak becomes sharp.

Further, the third resonance is produced at the third resonance frequency H3 (in the neighborhood of about 60 Hz, for instance) which is higher than the second resonance. By this third resonance, a relatively high damping is achieved in the neighborhood of the third resonance frequency.

This third resonance is not able to be created in the comparative example, and the dynamic characteristic on the higher frequency side that is not able to be realized by the comparative example can be improved by the third resonance.

Moreover, the first, second and third resonances come relatively close to each other and are created at intervals in a specific narrow range of frequencies (about 15~60 Hz, for instance). Therefore, in this entire range of frequencies, the dynamic characteristic is improved by these three resonances.

In addition, although, in the comparative example, the resonance range in which the dynamic characteristic is improved by the two resonances is limited to a range of about 15~50 Hz, the resonance range in this embodiment extends to a range of about 15~60 Hz, whereby the broadening of the resonance is achieved.

Namely, in this embodiment, the broadening of the resonance can be achieved by the three resonances, and the peaky characteristic can be realized in the dynamic characteristic curve.

Figure 7:
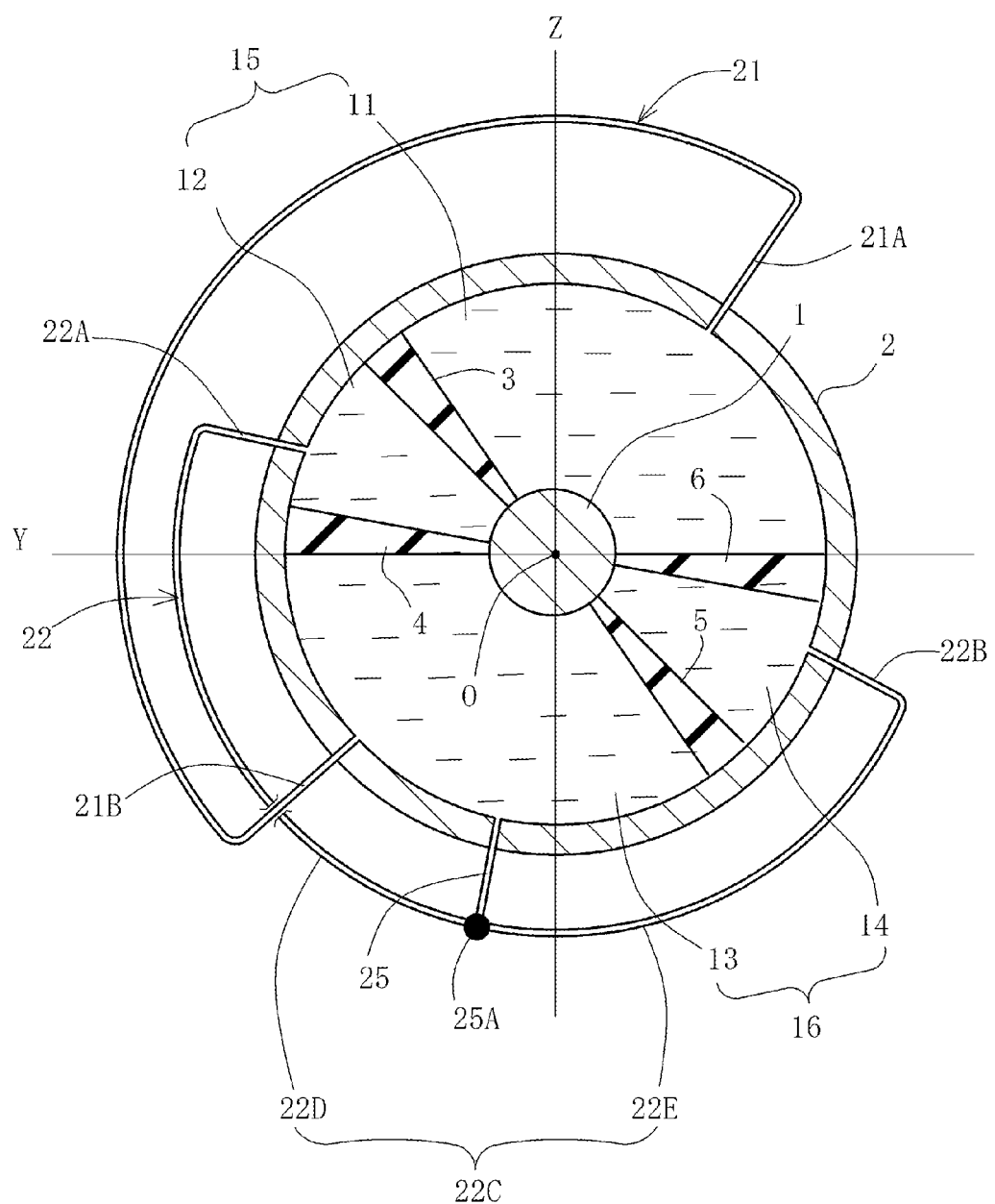
FIG. 7 is a theoretical cross sectional view corresponding to FIG. 3 in accordance with a second embodiment (FIGS. 7 to 10)
Figure 8:
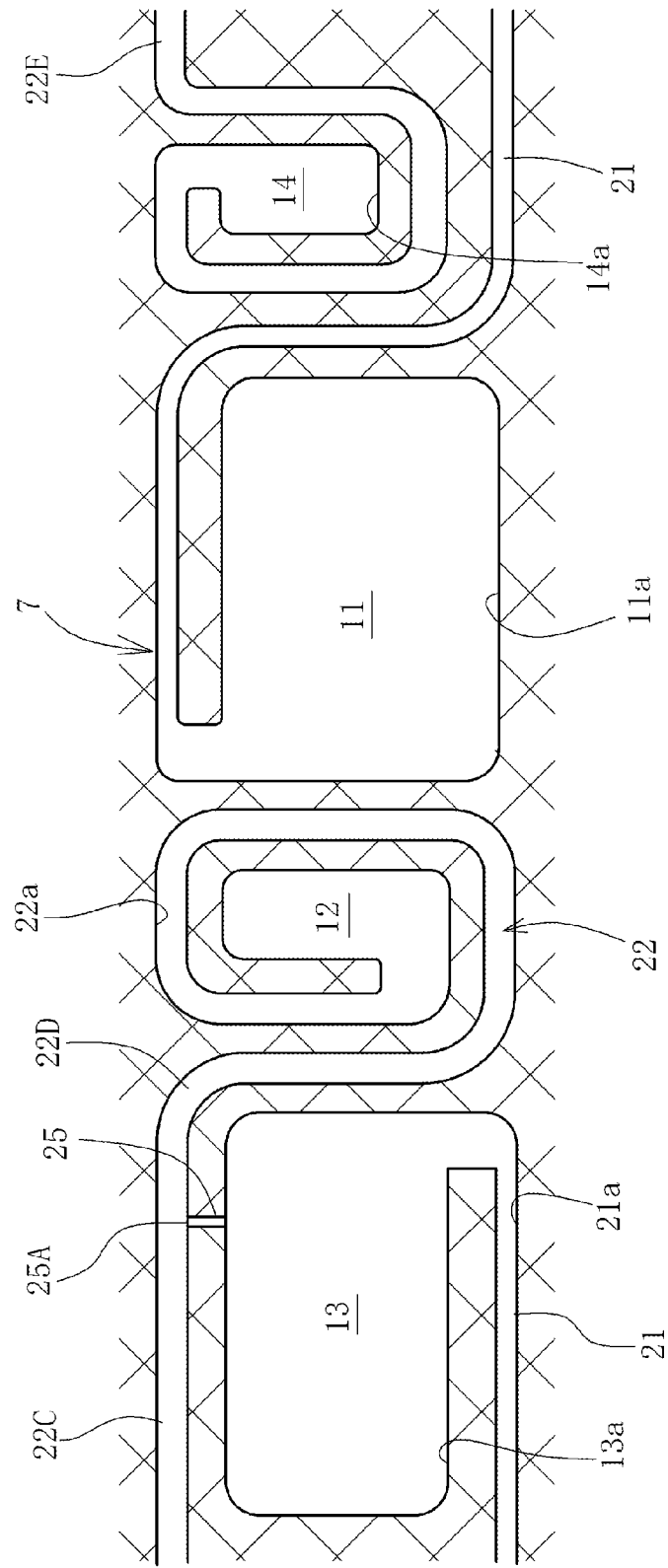
FIG. 8 is a development of liquid chambers and the orifices corresponding to FIG. 4.
Figure 9:
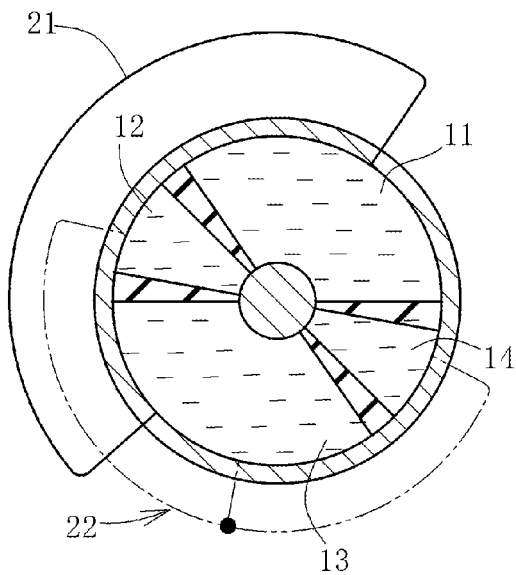
FIG. 9 is a view of assistance in explaining the operation corresponding to FIG. 5.
Figure 9:
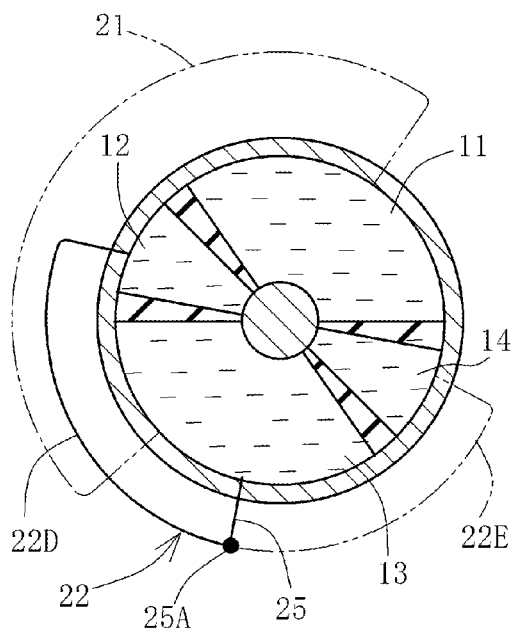
Figure 9:
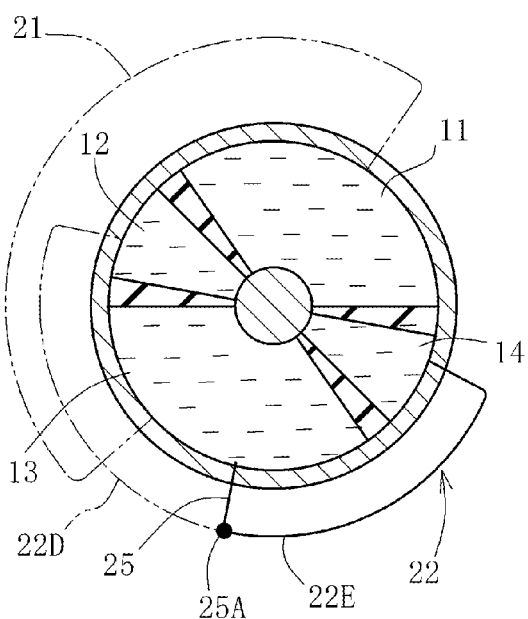
Figure 10:
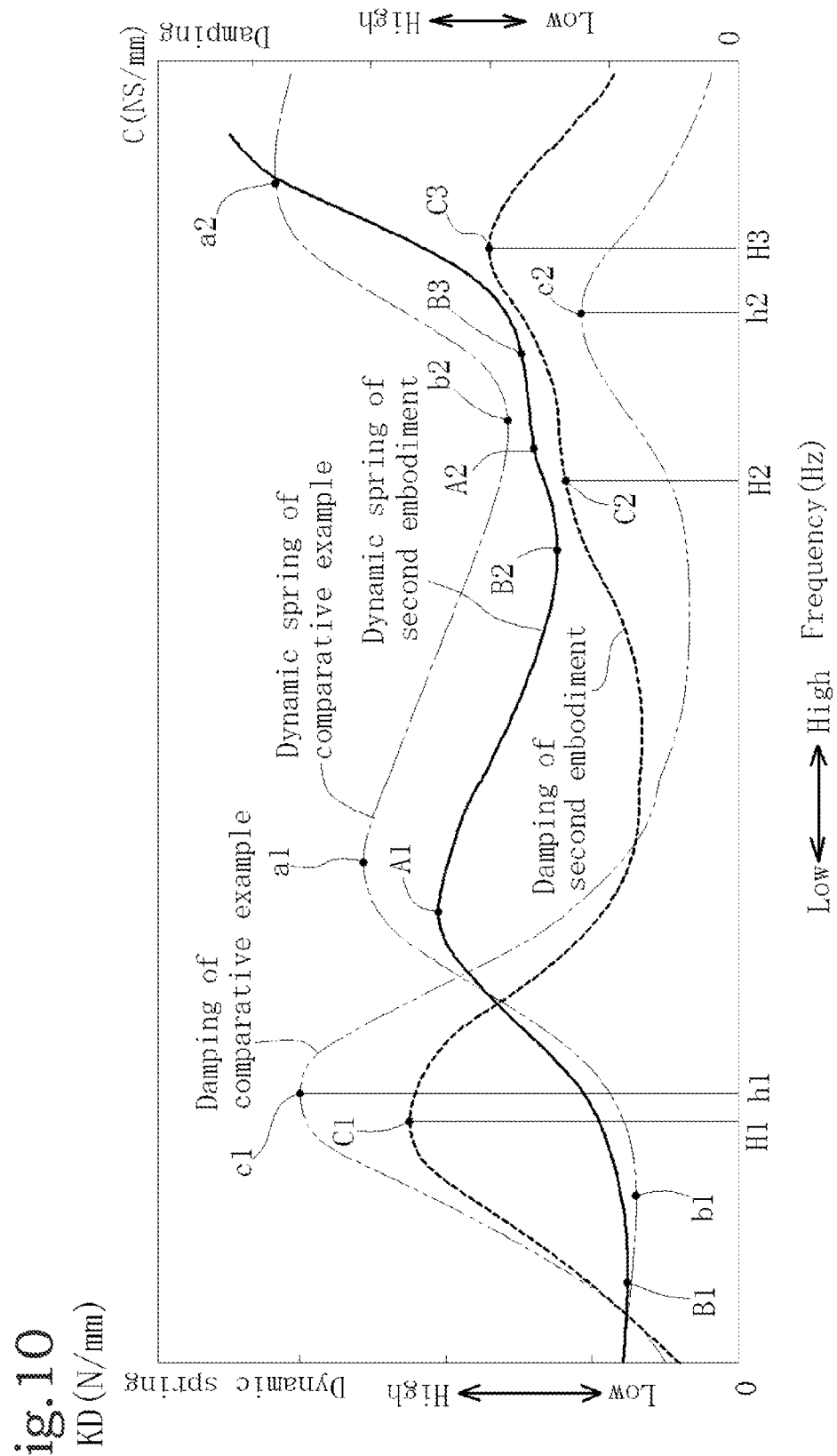
FIG. 10 is a graph of a dynamic characteristic corresponding to FIG. 6.

Next, a second embodiment will be explained. FIG. 7 is a theoretical cross sectional view corresponding to FIG. 3. FIG. 8 is a development of liquid chambers and the orifices corresponding to FIG. 4. FIG. 9 is a view of assistance in explaining the operation corresponding to FIG. 5. FIG. 10 is a graph of a dynamic characteristic corresponding to FIG. 6. By the way, the arrangement of each of the liquid chambers and the relationship between the variations in volume and the differences in volume change between the liquid chambers in accordance with expansion and contraction in FIG. 7 are the same as FIG. 3.

In this embodiment, as shown in FIG. 7, an intermediate portion of the second orifice 22 is connected through a third communicating passage 25 to the third liquid chamber 13.

Namely, an overlapping portion with the third liquid chamber 13, of the second orifice main body portion 22C located between the second liquid chamber side portion 22A and the fourth liquid chamber side portion 22B is connected through the third communicating passage 25 directly to the third liquid chamber 13, wherein "directly" means without the intermediary of the first orifice 21.

By the way, a reference character 25A denotes a connecting portion between the third communicating passage 25 and the second orifice 22.

The third communicating passage 25 establishes a short-circuit connection between the second orifice 22 and the third liquid chamber 13. The second orifice 22 is substantially divided into two sections at the connecting portion 25A with the third communicating passage 25 in such a manner as to form a first divided section 22D on the side of the second liquid chamber 12 and a second divided section 22E on the side of the fourth liquid chamber 14.

Namely, the first divided section 22D connects the second liquid chamber 12 and the third liquid chamber 13, so that the hydraulic liquid flows through the first divided section 22D and the third communicating passage 25 between the second liquid chamber 12 and the third liquid chamber 13.

The second divided section 22E connects the fourth liquid chamber 14 and the third liquid chamber 13, so that the hydraulic liquid flows through the second divided section 22E and the third communicating passage 25 between the fourth liquid chamber 14 and the third liquid chamber 13.

As shown in the development of the second orifice 22 of FIG. 8, an intermediate portion in the longitudinal direction of the second orifice main body portion 22C is connected by a short-circuit through the third communicating passage 25 to the third liquid chamber 13. Accordingly, the hydraulic liquid does not flow through the entire second orifice 22 between the second liquid chamber 12 and the fourth liquid chamber 14. The hydraulic liquid flows through any one of the first divided section 22D and the second divided section 22E. Therefore, the second resonance occurs through the first divided section 22D, and the third resonance occurs through the second divided section 22E.

By the way, there are differences in volume variation between the liquid chambers connected by each of the first divided section 22D and the second divided section 22E. The firs divided section 22D connects the second liquid chamber 12 and the third liquid chamber 13 which are expanded and contracted in the inverse relationship (in the opposite directions) to each other and which cause relatively large volume variations, while the second divided section 22E connects the third liquid chamber 13 and the fourth liquid chamber 14 which are expanded and contracted in the same direction with each other and which cause volume variations at the time of deformation. Relatively small volume changes are developed between the third liquid chamber 13 and the fourth liquid chamber 14. Therefore, when the hydraulic liquid flows, the first divided section 22D takes preference, whereby the hydraulic liquid flows through the first divided section 22D in the case where the first divided section 22D is not clogged. When the first divided section 22D is clogged, the hydraulic liquid flows through the second divided section 22E.

The second resonance and the third resonance occur after the first resonance through the first orifice 21.

Namely, when the second orifice 22 is short-circuited through the third communicating passage 25 with the third liquid chamber 13, three resonances consisting of the first resonance, the second resonance and the third resonance as a whole are produced. However, the flow amount of the hydraulic liquid flowing through the second orifice 22 is reduced by half. Therefore, although the resonance efficiency of the second resonance and the third resonance is lowered, the resonance is broadened.

Further, when the intermediate portion of the second orifice main body portion 22C is short-circuited directly with the third liquid chamber 13, it is able to be short-circuited without the intermediary of the first orifice 21, whereby the third communicating passage 25 is simplified. In addition, since the connecting portion between the second orifice main body portion 22C and the third communicating passage 25 extends along the third orifice 13 to a relatively large extent, the degree of freedom for selecting a connecting position is increased.

FIG. 9 shows a flowing manner of the hydraulic liquid in each of the resonances.

First, at the first resonance frequency, as shown in FIG. 9-A, the hydraulic liquid flows through the first orifice 21 between the first liquid chamber 11 and the third liquid chamber 13, whereby it is resonated at the first resonance frequency H1. At that time, the hydraulic liquid does not flow to the second orifice side.

Next, when the frequency of the input vibration is heightened and the first orifice 21 is clogged, the hydraulic liquid flows into the second orifice 22 as shown in FIG. 9-B. At that time, since the intermediate portion of the second orifice 22 is short-circuited through the third communicating passage 25 with the third liquid chamber 13, at first the hydraulic liquid flows between the second liquid chamber 12 and the third liquid chamber 13 through the first divided section 22D which is easy to flow, whereby the second resonance is produced at the second resonance frequency H2. Then, the hydraulic liquid does not flow to the second divided section 22E side.

Subsequently, when the frequency of the input vibration is further heightened and the first divided section 22D is clogged, the hydraulic liquid flows through the third communicating passage 25 and the second divided section 22E between the third liquid chamber 13 and the fourth liquid chamber 14 which belong to the same lower liquid chamber group 16 and which are different in the volume variation size, whereby the third resonance is produced at the third resonance frequency H3 (H1<H2<H3).

In such a way as described above, three resonances consisting of the first resonance, the second resonance and the third resonance are produced, so that the resonance range is enlarged into a broad frequency range so as to be broadened.

FIG. 10 is a graph showing the dynamic characteristics between this embodiment and the comparative example, in which in common with FIG. 6, a thick solid line is a dynamic spring curve of this embodiment, and a thick dotted line is a damping curve of this embodiment. In addition, a thin chain line is a dynamic spring curve of a comparative example, and a thin two-dot chain line is a damping curve thereof. Moreover, the dynamic characteristic of the comparative example is the same as that in FIG. 6. In addition, concrete numerical values at each of points A, B and C in the graph and concrete numerical values of each of the first resonance frequency H1, the second resonance frequency H2 and the third resonance frequency H3 are different from the first embodiment.

First, in the dynamic characteristic curve in this embodiment, a bottom B1 occurs by the first resonance, a bottom B2 occurs by the second resonance, and a bottom B3 occurs by the third resonance, and peaks of the antiresonances A1 and A2 are produced in response to these bottoms (a third peak is outside an indication area of the graph and is not visible).

Further, in the damping curve, there are produced a peak C1 by the first resonance, a peak C2 by the second resonance and a peak C3 by the third resonance.

When comparing this embodiment with the comparative example, the first resonance of the present invention is produced at the first resonance frequency H1 (in the neighborhood of about 15 Hz, for instance) which is a little lower than the first resonance frequency h1 of the comparative example. The dynamic spring is a little higher than that of the comparative example, and the damping is lower than that of the comparative example. The first resonance frequency of the comparative example is designated by h1 and the second resonance frequency thereof is designated by h2.

Further, the second resonance is produced at the second resonance frequency H2 (in the neighborhood of about 40 Hz, for instance) which is located between the first resonance frequency h1 and the second resonance frequency h2 of the comparative example. The dynamic spring is a little lower dynamic spring (B2<b2), and the damping also is a little higher damping (C2>c2).

Further, the third resonance is produced at the third resonance frequency H3 (in the neighborhood of about 55 Hz, for instance) which is higher than the second resonance frequency H2 and which is a little higher than the second resonance frequency h2 of the comparative example. The dynamic spring is a little lower dynamic spring (B3<b2) that the bottom B3 is a little lower than the bottom b2, and the damping is a higher damping (C3>c2) that the peak C3 is higher than the peak c2.

Namely, in this embodiment, three resonances are indicated in the frequency range (h1~h2: in the range of around 10 Hz to around 50 Hz corresponding to H1 to H3 of this embodiment) in which two resonances are produced in the comparative example. The first resonance occurs at the frequency range (H1 and h1) substantially similar to the first resonance of the comparative example, and the third resonance occurs at the frequency range (H3 and h2) substantially similar to the second resonance of the comparative example. The second resonance of this embodiment occurs at the frequency range between the first resonance and the second resonance of the comparative example. The second resonance frequency H2 is located between the frequencies h1 and h2 at which the first resonance and the second resonance of the comparative example are produced.

Accordingly, the dynamic characteristic between the first resonance (c1) and the second resonance (c2) is improved, and the dynamic spring curve and the damping curve present a flattened table land form to show a lower dynamic spring and a higher damping.

This means that three resonances more than the comparative example are produced in the frequency range (h1 to h2 and H1 to H3) similar to the comparative example, whereby the dynamic characteristic is improved in such a manner as to realize the low dynamic spring and the high damping throughout this frequency range. Thus, the effect of the resonance in this embodiment is extended to an intermediate frequency range in which effects of the first resonance and the second resonance in the comparative example are reduced.

Namely, in this embodiment, the resonance range is extended to the wider frequency range in the frequency range (from h1 to h2) between the first resonance and the second resonance of the comparative example, so that the broadening of the resonance is realized.

Moreover, in comparison with the first embodiment, this broadening is desirable, since it presents a more improved dynamic characteristic in such a manner that the peaky dynamic characteristic in the resonance range (H1 to H3) of the first embodiment is more flattened.

Further, in this embodiment, the first resonance frequency H1 is a little lower than the first resonance frequency h1 of the comparative example, the third resonance frequency H3 is a little higher than the second resonance frequency h2 of the comparative example. Accordingly, in this embodiment, the resonance range is more extended by three resonances than the area between h1 and h2 of the comparative example, whereby there is also realized the broadening to the effect that the resonance range is extended to the broader frequency range.

By the way, the present invention is not limited to each of the above embodiments, and various changes and modifications may be made in the invention without departing from the spirit and scope thereof.

Figure 11:
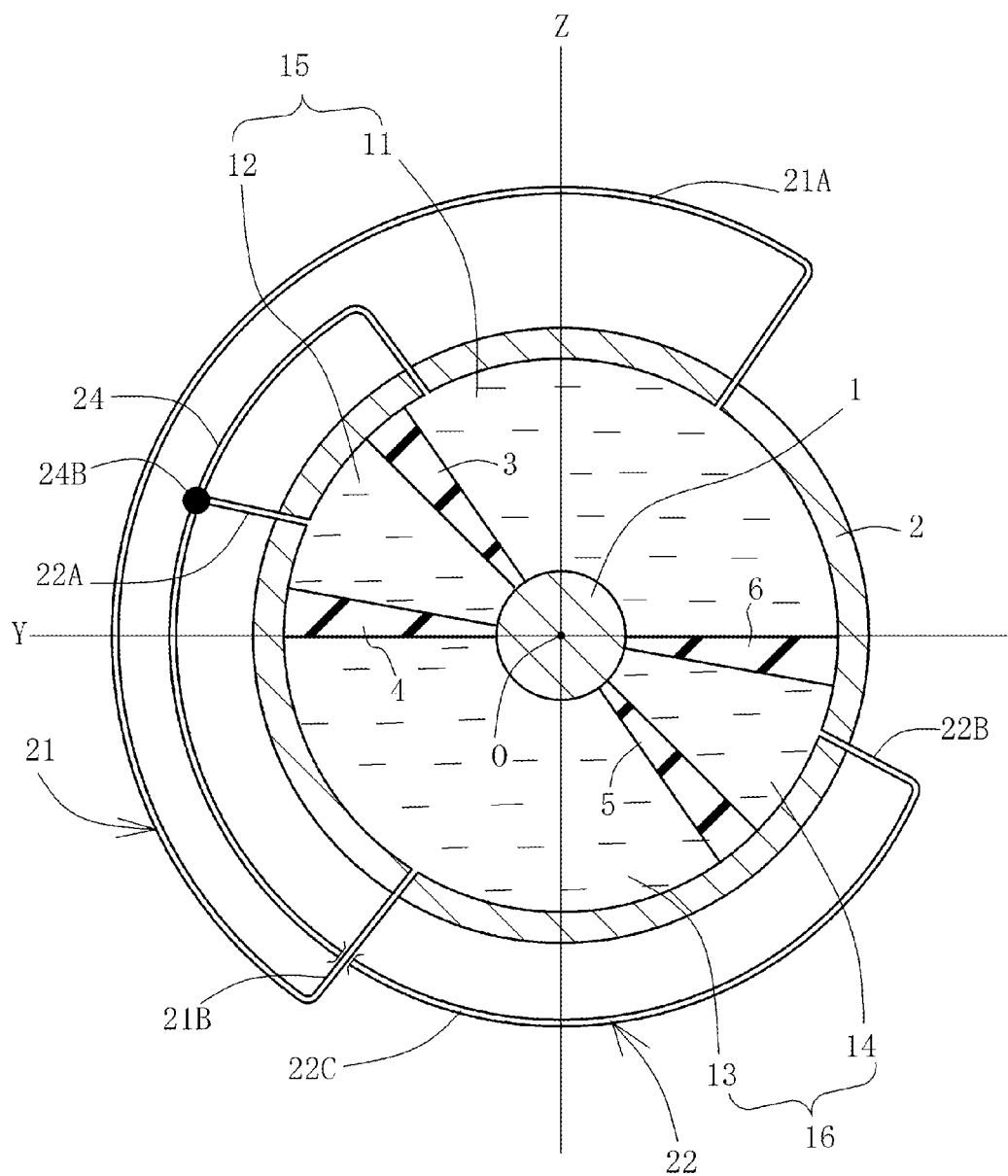
FIG. 11 is a view corresponding to FIG. 3, showing a variation of the first embodiment.

For instance, as a variation of the first embodiment, without short-circuiting the two orifices, the second orifice 22 may be connected directly to the first liquid chamber 11 which is not the pair of liquid chambers (another liquid chamber except a pair of liquid chambers to which an orifice is connected) connected by the second orifice 22 in the first embodiment. This is shown in FIG. 11. In FIG. 11, since only the first communicating passage 23 in FIG. 3 is changed into a second communicating passage 24 of another embodiment, like elements are given like reference characters.

In this drawing, the second liquid chamber side portion 22A of the second orifice 22 branches into the second communication passage 24 which extends to the firs liquid chamber 11 side. This extending distal end is connected directly to the first liquid chamber 11. In this case, the first resonance is produced through the first orifice 21, the second resonance is produced through the second orifice 22 between the enlarged liquid chamber consisting of the first liquid chamber 11 and the second liquid chamber 12 and the fourth liquid chamber 14, and the third resonance is produced through the second communicating passage 24 between the first liquid chamber 11 and the second liquid chamber 12.

Further, the second communicating passage 24, as shown by a phantom line in FIG. 4, is able to be easily formed by communicating between a portion of the second orifice 22 and a portion of the first liquid chamber 11 which extend close to and in parallel with each other. In this way, since two portions are communicated without intermediary of the first orifice 21, the structure of the second communicating passage 24 becomes simple for that. Moreover, since the second communicating passage 24 is able to be connected to any location of the second liquid chamber side portion 22A of the second orifice 22 which extends along the first liquid chamber 11, the degree of freedom of the second communicating passage 24 is increased.

Figure 12:
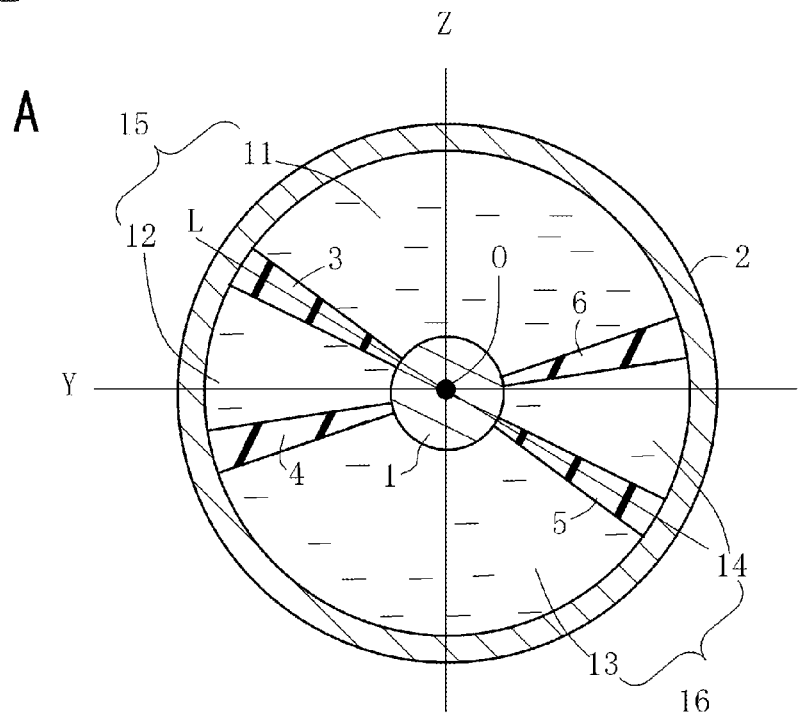
FIG. 12 is a cross sectional view showing variations of elastic walls.
Figure 12:
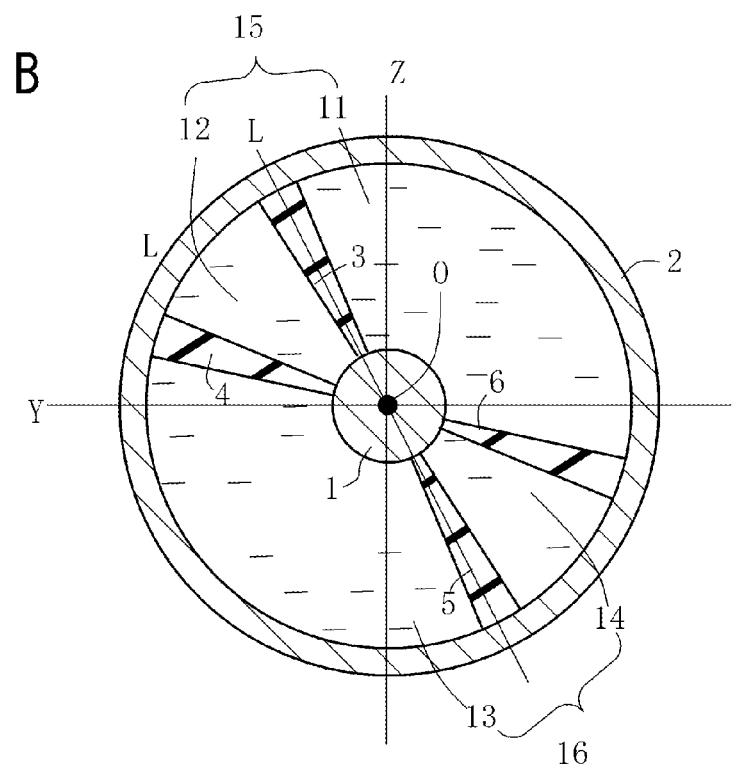

Further, the upper liquid chamber group 15 and the lower liquid chamber group 16 may be not necessarily arranged symmetrical in the upward and downward direction on either side of the Y axis. As shown in FIG. 12-A, when the second elastic wall 4 and fourth elastic wall 6 which extend in the substantially horizontal direction along the Y axis are inclined in such a manner that the second elastic wall 4 is located slightly below the Y axis while the fourth elastic wall 6 is located slightly above the Y axis, a portion of the second liquid chamber 12 may be located slightly below the Y axis and a portion of the fourth liquid chamber 14 may be located slightly above the Y axis. With this arrangement, also, the upper liquid chamber group 15 and the lower liquid chamber group 16 carry out the volume variations in the opposite directions to each other when the main vibration has been inputted in the direction of the Z axis. Moreover, each of the liquid chambers forming the same liquid chamber group causes the difference in volume change at the time of deformation.

By the way, the orifices are omitted in FIG. 12-A, and FIG. 12-B and FIG. 13 to be referred to later.

Further, as shown in FIG. 12-B, the second elastic wall 4 and the fourth elastic wall 6 may be inclined inversely in such a manner that a portion of the first liquid chamber 11 is located slightly below the Y axis and a portion of the third liquid chamber 13 is located slightly above the Y axis. With this arrangement, in the similar way to the case in FIG. 12-A, the upper liquid chamber group 15 and the lower liquid chamber group 16 carry out the volume variations in the opposite directions to each other when the main vibration has been inputted in the direction of the Z axis. In addition, each of the liquid chambers forming the same liquid chamber group causes the difference in volume change at the time of deformation.

In short, it will be sufficient when the liquid chambers of the upper liquid chamber group 15 and the lower liquid chamber group 16 cause the volume variations in the opposite directions to each other at the time of having inputted the main vibration in the direction of the Z axis, and when each of the liquid chambers forming the upper liquid chamber group 15 or the lower liquid chamber group 16 causes the difference in volume change at the time of deformation.

Figure 13:
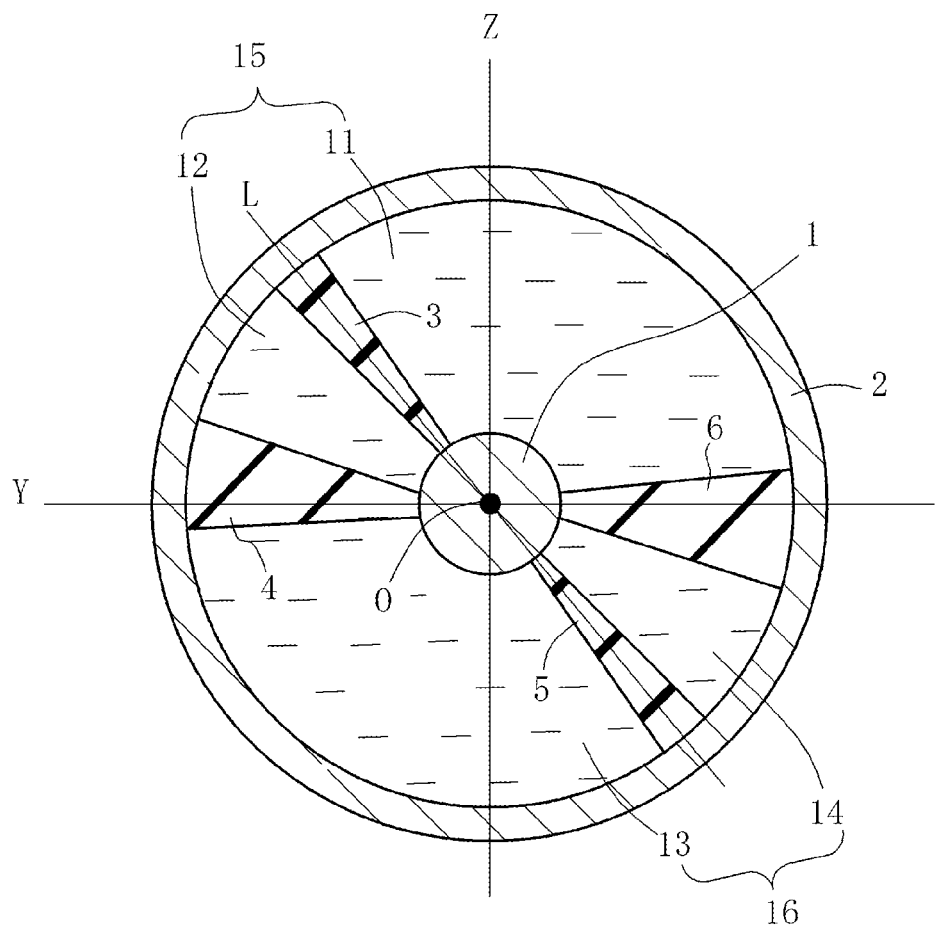
FIG. 13 is a cross sectional view showing variations in relation to a change in thickness of the elastic walls.

Further, as shown in FIG. 13, the elastic walls (the first elastic wall 3 and the third elastic wall 5: the second elastic wall 4 and the fourth elastic wall 6) which are formed in pairs may be changed in thickness. For instance, the second elastic wall 4 and the fourth elastic wall 6 are made relatively thicker, while the first elastic wall 3 and the third elastic wall 5 are made relatively thinner.

With this structure, since there is changed the spring of the elastic wall which has an influence on the volume change of each of the liquid chambers, the flow amount of the hydraulic liquid can be changed whereby the resonance efficiency in any one of the resonances can be adjusted.

In addition, although, in each of the above embodiments, there are provided four liquid chambers and two orifices, an even number of six or more liquid chambers and three or more orifices may be provided.

Figure 14:
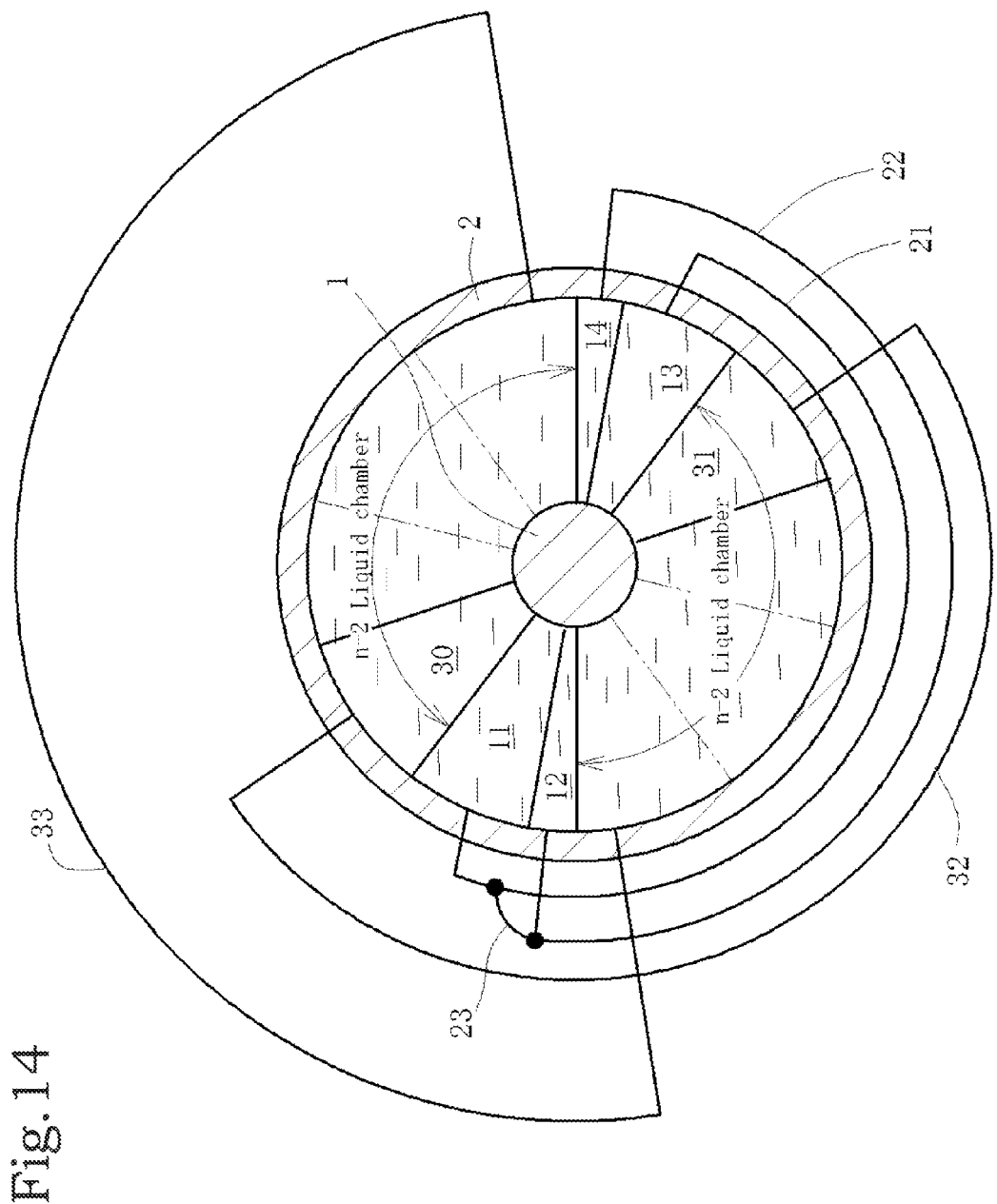
FIG. 14 is a cross sectional view corresponding to FIG. 3, showing a variation that the number of liquid chambers is 2n.

Namely, as shown in FIG. 14, there are provided n pairs (n is an integer of not less than 2) of liquid chambers and n orifices. In the example shown in the drawing, the upper liquid chamber group is provided with a total of n liquid chambers consisting of the first liquid chamber 11, the second liquid chamber 12, and a fifth liquid chamber 30 (n−2 liquid chambers including the fifth liquid chamber 30 are formed in an area excluding the first liquid chamber 11 and the second liquid chamber 12).

Similarly, the lower liquid chamber group is provided with a total of n liquid chambers consisting of the third liquid chamber 13, the fourth liquid chamber 14, and a sixth liquid chamber 31 (n−2 liquid chambers including the sixth liquid chamber 31 are formed in an area excluding the third liquid chamber 13 and the fourth liquid chamber 14).

Further, the first liquid chamber 11 and the third liquid chamber 13 are connected by the first orifice 21. The second liquid chamber 12 and the fourth liquid chamber 14 are connected by the second orifice 22. The fifth liquid chamber 30 and the sixth liquid chamber 31 are connected by a third orifice 32. In this way, other liquid chambers formed in pairs are connected by an orifice. An orifice which connects an n−2 liquid chamber of the upper liquid chamber group and an n−2 liquid chamber of the lower liquid chamber group is an n-th orifice 33.

Namely, there are provided n orifices connecting n pair of liquid chambers, whereby n resonances are produced.

Then, when at least an orifice is communicated with another orifice or a liquid chamber which is not formed in pairs, at least n+1 or more resonances can be produced.

For instance, as shown in FIG. 3, the second orifice 22 can be connected through the first communicating passage 23 to the first orifice 21. In addition, as shown in FIG. 11, the second orifice 22 also can be directly connected through the second communicating passage 24 to the first liquid chamber 11. Moreover, as shown in FIG. 7, the second orifice 22 can be directly connected through the third communicating passage 25 to the third liquid chamber 13.

Further, the plural communicating passages of not less than 2 can be provided, and the plural number of resonances by adding the number of the communicating passages to n can be produced. For instance, when the number of the communicating passages is x, the resonances to be produced are n+x.

Next, the variations of the first and second embodiments with respect to the connections of the first orifice 21, the second orifice 22, the first communicating passage 23, the second communicating passage 24 and the third communicating passage 25 will be explained.

Figure 15:
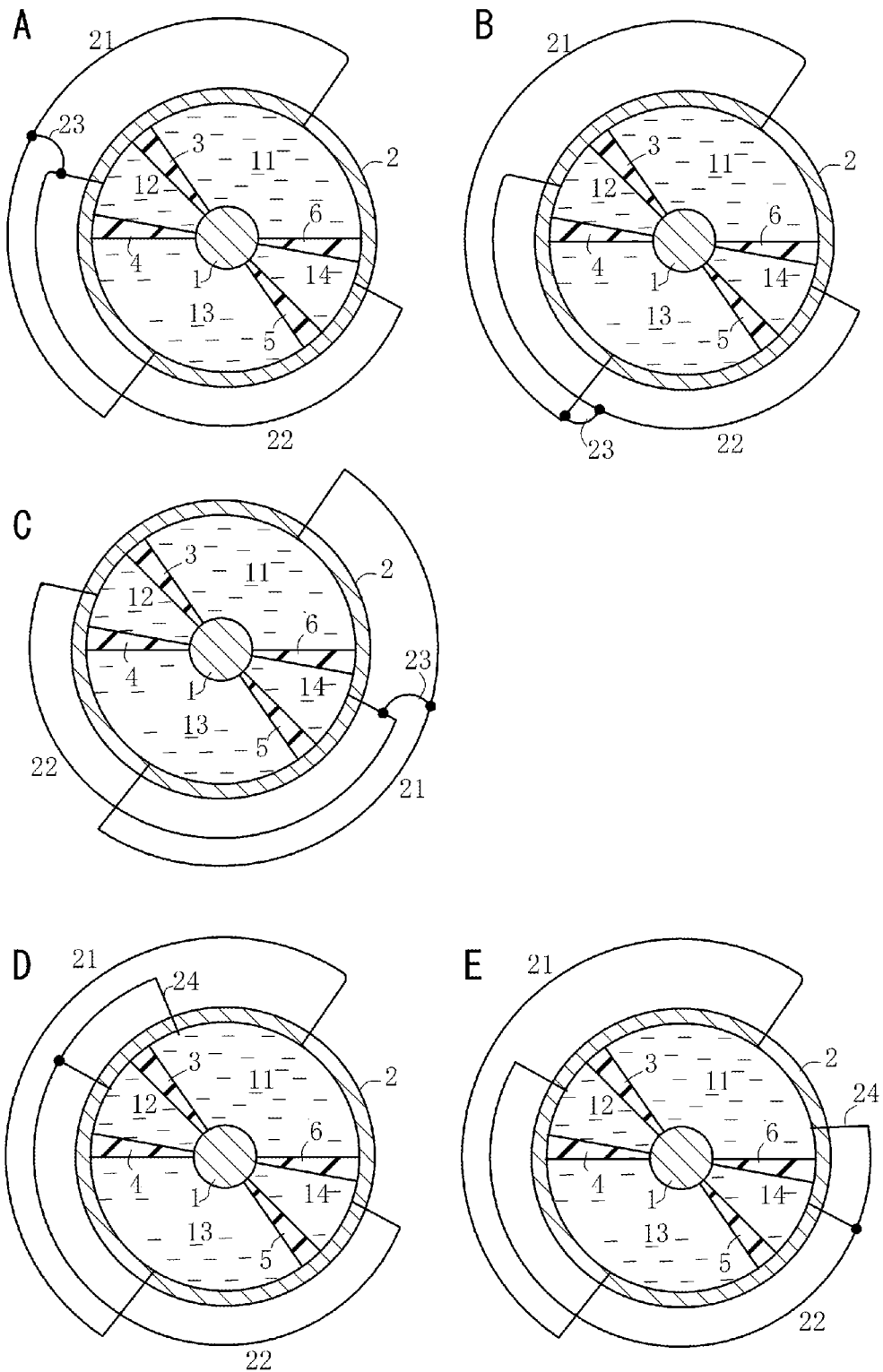
FIG. 15 is a view showing variations of the first embodiment.

FIG. 15 shows variations of the first embodiment, wherein a view A is a more simplified illustration of FIG. 3, and views B through E are variations.

In FIG. 15-B, the first orifice 21 is connected through the first communicating passage 23 to an intermediate portion in the longitudinal direction of the second orifice 22 in the vicinity of the third liquid chamber 13.

In FIG. 15-C, the second orifice 22 is connected through the first communicating passage 23 to an intermediate portion in the longitudinal direction of the first orifice 21 in the vicinity of the fourth liquid chamber 14.

FIG. 15-D is a more simplified illustration of the FIG. 11. FIG. 15-E, as against FIG. 15-D, shows the condition that the second communicating passage 24 provides a direct connection between the fourth liquid chamber 14 neighboring portion of the second orifice 22 and the first liquid chamber 11.

Figure 16:
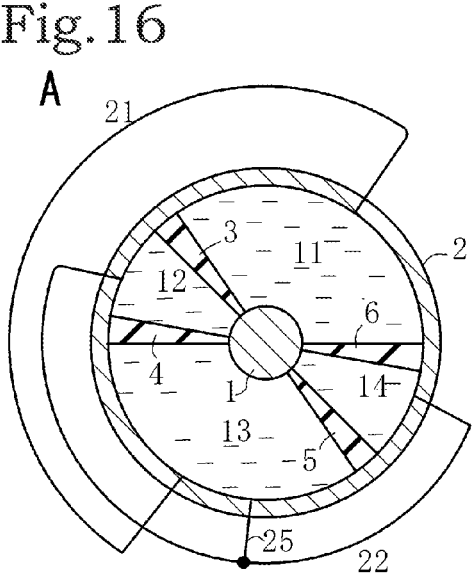
FIG. 16 is a view showing variations of the second embodiment.
Figure 16:
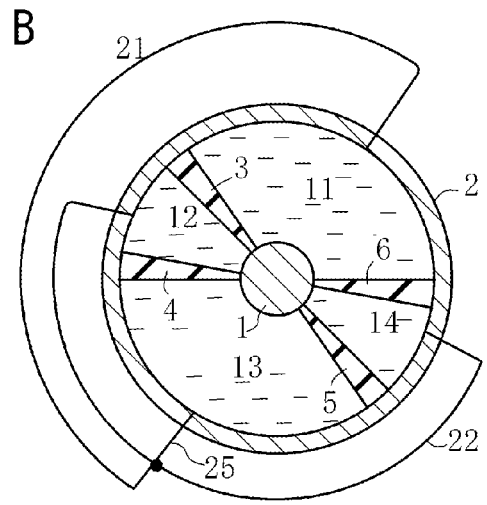
Figure 16:
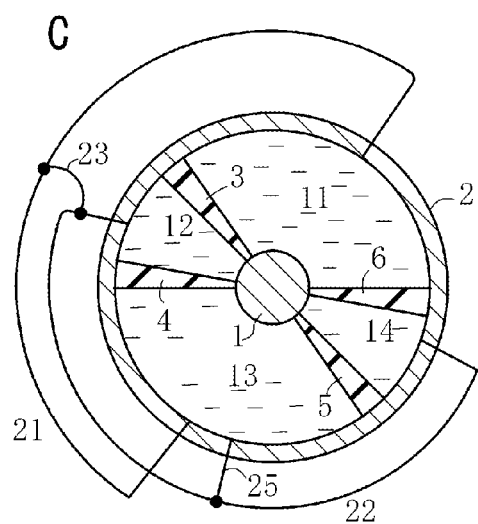
Figure 16:
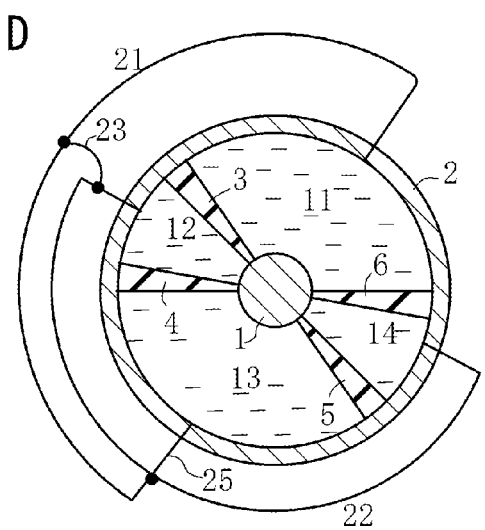
Figure 16:
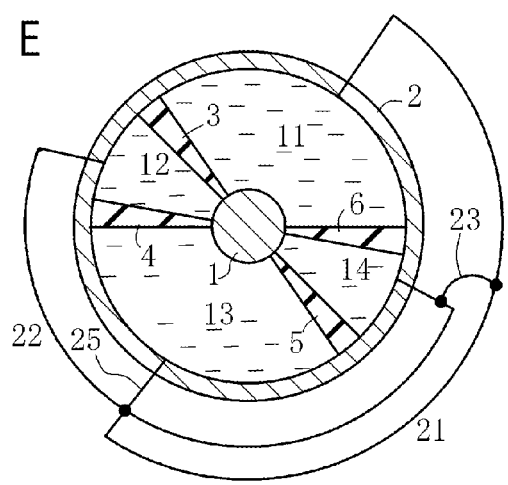

FIG. 16 shows variations of the second embodiment, wherein a view A is a more simplified illustration of FIG. 7, and views B through E are variations.

In FIG. 16-B, the first orifice 21 is connected directly to an intermediate portion of the second orifice 22 in the vicinity of the third liquid chamber 13, wherein a portion of the first orifice 21 is shared with the third communicating passage 25, so that the third communicating passage 25 is not provided independently.

FIG. 16-C shows a combination between the first embodiment and the second embodiment, wherein, as against FIG. 16-A, the second orifice 22 is connected through the first communicating passage 23 to an intermediate portion in the longitudinal direction of the first orifice 21 in the vicinity of the second liquid chamber 12.

In FIG. 16-D, as against FIG. 16-B, in a similar way to FIG. 16-C, the second orifice 22 is connected through the first communicating passage 23 to the intermediate portion in the longitudinal direction of the first orifice 21 in the vicinity of the second liquid chamber 12.

In FIG. 16-E, as against FIG. 16-D, the second orifice 22 is connected through the first communicating passage 23 to the intermediate portion in the longitudinal direction of the first orifice 21 in the vicinity of the fourth liquid chamber 14.

What is claimed is:

1. A liquid sealed bushing comprising:
   an inner cylinder,
   an outer cylinder,
   an elastic vibration isolating member elastically connecting the inner and outer cylinders,
   a first liquid chamber group and a second liquid chamber group being partitioned by the elastic vibration isolating member to cause expanding and contracting variations in volume relative to an input vibration and being formed in pairs such that expansion and contraction occur in an inverse relationship between the first liquid chamber group and the second liquid chamber group, the first liquid chamber group being further partitioned into at least a first liquid chamber and a second liquid chamber to cause a difference in volume change at the time of deformation, the second liquid chamber group being further partitioned into at least a third liquid chamber and a fourth liquid chamber to cause a difference in volume change at the time of deformation,
   a first orifice providing a connection between the first liquid chamber and the third liquid chamber, and
   a second orifice providing a connection between the second liquid chamber and the fourth liquid chamber, the first and second orifices being configured to create two resonances composed of a first resonance by the first orifice and a second resonance by the second orifice,
   wherein one of the first orifice and the second orifice communicates with another liquid chamber which is different from the pair of liquid chambers between which the one of the first and second orifices provides the connection, whereby, in the case of the first orifice, the first orifice also communicates with one of the second liquid chamber or fourth liquid chamber, or, in the case of the second orifice, the second orifice also communicates with one of the first liquid chamber or the third liquid chamber, and thereby
   a third resonance which is different from the first resonance and the second resonance is created.

2. The liquid sealed bushing according to claim 1, wherein a portion of the second orifice located in the vicinity of the second liquid chamber is connected through a communicating passage to a portion of the first orifice located in the vicinity of the first liquid chamber.

3. The liquid sealed bushing according to claim 2, wherein the first liquid chamber and the second liquid chamber are partitioned by a first elastic wall, the second liquid chamber and the third liquid chamber are partitioned by a second elastic wall, the third liquid chamber and the fourth liquid chamber are partitioned by a third elastic wall, and the fourth liquid chamber and the first liquid chamber are partitioned by a fourth elastic wall, wherein the second elastic wall and the fourth elastic wall are arranged substantially along a direction (Y) orthogonal to a main vibration inputting direction (Z) and to an axial direction (X) of the inner cylinder, and the first elastic wall and the third elastic wall are arranged to intersect diagonally the orthogonal direction (Y).

4. The liquid sealed bushing according to claim 2, wherein there are provided n pairs (n is an integer of not less than 2) of liquid chambers including the first through fourth liquid chambers, and n orifices communicating between these liquid chambers formed in pairs, in such a manner as to create at least n+1 or more resonances.

5. The liquid sealed bushing according to claim 1, wherein a portion of the second orifice located in the vicinity of the second liquid chamber is directly connected by a communicating passage to the first liquid chamber.

6. The liquid sealed bushing according to claim 5, wherein the first liquid chamber and the second liquid chamber are partitioned by a first elastic wall, the second liquid chamber and the third liquid chamber are partitioned by a second elastic wall, the third liquid chamber and the fourth liquid chamber are partitioned by a third elastic wall, and the fourth liquid chamber and the first liquid chamber are partitioned by a fourth elastic wall, wherein the second elastic wall and the fourth elastic wall are arranged substantially along a direction (Y) orthogonal to a main vibration inputting direction (Z) and to an axial direction (X) of the inner cylinder, and the first elastic wall and the third elastic wall are arranged to intersect diagonally the orthogonal direction (Y).

7. The liquid sealed bushing according to claim 5, wherein there are provided n pairs (n is an integer of not less than 2) of liquid chambers including the first through fourth liquid chambers, and n orifices communicating between these liquid chambers formed in pairs, in such a manner as to create at least n+1 or more resonances.

8. The liquid sealed bushing according to claim 1, wherein the first liquid chamber and the second liquid chamber are partitioned by a first elastic wall, the second liquid chamber and the third liquid chamber are partitioned by a second elastic wall, the third liquid chamber and the fourth liquid chamber are partitioned by a third elastic wall, and the fourth liquid chamber and the first liquid chamber are partitioned by a fourth elastic wall, wherein the second elastic wall and the fourth elastic wall are arranged substantially along a direction (Y) orthogonal to a main vibration inputting direction (Z) and to an axial direction (X) of the inner cylinder, and the first elastic wall and the third elastic wall are arranged to intersect diagonally the orthogonal direction (Y).

9. The liquid sealed bushing according to claim 8, wherein there are provided n pairs (n is an integer of not less than 2) of liquid chambers including the first through fourth liquid chambers, and n orifices communicating between these liquid chambers formed in pairs, in such a manner as to create at least n+1 or more resonances.

10. The liquid sealed bushing according to claim 1, wherein there are provided n pairs (n is an integer of not less than 2) of liquid chambers including the first through fourth liquid chambers, and n orifices communicating between these liquid chambers formed in pairs, in such a manner as to create at least n+1 or more resonances.

* * * * *